US012571373B2

(12) United States Patent
Liu et al.

(10) Patent No.: US 12,571,373 B2
(45) Date of Patent: Mar. 10, 2026

(54) OFFSHORE WIND TURBINE SYSTEMS AND PROCESSES FOR INSTALLING SAME

(71) Applicant: SOFEC, INC., Houston, TX (US)

(72) Inventors: Yonghui Liu, Houston, TX (US); Hao Yu, Katy, TX (US); Zhiyong Su, Houston, TX (US); Arun S. Duggal, Houston, TX (US); Yu Ding, Houston, TX (US); Stephen P. Lindblade, Waller, TX (US)

(73) Assignee: SOFEC, INC., Houston, TX (US)

( * ) Notice: Subject to any disclaimer, the term of this patent is extended or adjusted under 35 U.S.C. 154(b) by 157 days.

(21) Appl. No.: 18/182,120

(22) Filed: Mar. 10, 2023

(65) Prior Publication Data

US 2023/0287869 A1     Sep. 14, 2023

Related U.S. Application Data

(60) Provisional application No. 63/319,089, filed on Mar. 11, 2022.

(51) Int. Cl.

| | |
|---|---|
| *F03D 13/25* | (2016.01) |
| *B63B 21/50* | (2006.01) |
| *B63B 43/06* | (2006.01) |
| *F03D 9/25* | (2016.01) |
| *B63B 35/44* | (2006.01) |
| *F03D 13/10* | (2016.01) |

(52) U.S. Cl.
CPC ............ *F03D 13/25* (2016.05); *B63B 21/507* (2013.01); *B63B 43/06* (2013.01); *F03D 9/25* (2016.05);
(Continued)

(58) Field of Classification Search
CPC . F03D 13/25; F03D 9/25; F03D 13/10; F03D 13/256; B63B 21/507; B63B 43/06;
(Continued)

(56) References Cited

U.S. PATENT DOCUMENTS

| | | |
|---|---|---|
| 7,513,208 B1 | 4/2009 | Seaman et al. |
| 7,717,762 B2 | 5/2010 | Boatman et al. |
| | (Continued) | |

FOREIGN PATENT DOCUMENTS

| | | |
|---|---|---|
| CN | 111021393 A | 4/2020 |
| GB | 2466477 B | 1/2012 |
| | (Continued) | |

OTHER PUBLICATIONS

International Search Report and Written Opinion of the International Searching Authority dated May 30, 2023, for PCT/US2023/064158.

*Primary Examiner* — Joseph Ortega
(74) *Attorney, Agent, or Firm* — Edmonds & Omaidalka, P.C.

(57)     ABSTRACT

Offshore wind turbine systems and processes for installing same. The system can include a wind turbine generator that can include a plurality of blades connected thereto. The system can also include a first support arm and a second support arm each having a first end and a second end. The system can also include a support structure that can be configured to float on a surface of a body of water that can include first, second, and third columns. The first end of the first support arm and the first end of the second support arm can each support the wind turbine generator at an elevation above the support structure. The second end of the first support arm can be connected to and supported by the first column. The second end of the second support arm can be connected to and supported by the second column.

24 Claims, 19 Drawing Sheets

(52) U.S. Cl.
CPC ......... *B63B 35/44* (2013.01); *B63B 2035/446* (2013.01); *F03D 13/10* (2016.05); *F05B 2240/93* (2013.01); *F05B 2240/95* (2013.01)

(58) Field of Classification Search
CPC .............. B63B 35/44; B63B 2035/446; B63B 2001/128; F05B 2240/93; F05B 2240/95; Y02E 10/72; Y02E 10/727
See application file for complete search history.

(56) References Cited

U.S. PATENT DOCUMENTS

| | | | |
|---|---|---|---|
| 8,823,198 | B2 | 9/2014 | De Boer |
| 9,528,501 | B2 | 12/2016 | Tsouroukdissian |
| 9,976,540 | B2 | 5/2018 | Guyot |
| 10,661,862 | B2 | 5/2020 | Melis et al. |
| 10,677,224 | B2 | 6/2020 | Cruse |
| 11,060,507 | B2 | 7/2021 | Casanovas Bermejo et al. |
| 11,448,193 | B2 | 9/2022 | Wong |
| 2012/0043763 | A1 | 2/2012 | De Boer |
| 2016/0061192 | A1 | 3/2016 | Gyot |
| 2016/0245261 | A1 | 8/2016 | Cruse |
| 2020/0173422 | A1* | 6/2020 | Casanovas Bermejo ................... F03D 80/82 |
| 2020/0392946 | A1 | 12/2020 | Wong |
| 2022/0126957 | A1 | 4/2022 | Johnsen et al. |
| 2022/0297802 | A1 | 9/2022 | Liegard et al. |

FOREIGN PATENT DOCUMENTS

| | | |
|---|---|---|
| JP | 2005264865 A | 9/2005 |
| JP | 2011245879 A | 12/2011 |

* cited by examiner

1400

122

120

1412

1410

1414

1420

132

142

130

140

134

144

119

116

112

114

110

118

116

1955

1957

1952

1951

150

OFFSHORE WIND TURBINE SYSTEMS AND PROCESSES FOR INSTALLING SAME

CROSS-REFERENCE TO RELATED APPLICATION

This application claims priority to U.S. Provisional Patent Application No. 63/319,089, filed on Mar. 11, 2022, which is incorporated by reference herein.

FIELD

Embodiments described generally relate to offshore floating wind turbine systems and processes for installing same.

BACKGROUND

Wind turbines convert the kinetic energy of wind into mechanical power that drives a generator to produce electricity. The produced electricity can be used locally and/or provided to an electricity grid for further distribution. Floating offshore wind turbine systems generally include a support platform that supports the wind turbine and a mooring system. A main challenge in supporting the wind turbine is maintaining the support platform in a stable position because the turbine is located at a large elevation above the support platform, which elevates the center of gravity of the offshore wind turbine system. Another challenge is mooring or anchoring the floating offshore wind turbine system to the seabed.

There is a need, therefore, for improved floating offshore wind turbine systems and processes for installing same.

SUMMARY

Offshore floating wind turbine systems and processes for installing same are provided. In some embodiments, the offshore wind turbine system can include a wind turbine generator that can include a plurality of blades connected thereto. The system can also include a first support arm and a second support arm each having a first end and a second end. The system can also include a support structure that can be configured to float on a surface of a body of water that can include a first column, a second column, and a third column. The first end of the first support arm and the first end of the second support arm can each support the wind turbine generator at an elevation above the support structure. The second end of the first support arm can be connected to and supported by the first column. The second end of the second support arm can be connected to and supported by the second column.

In some embodiments, a process for installing a floating wind turbine support structure can include laying a plurality of mooring legs on a floor of a body of water. An anchor structure that includes a buoyancy module can be positioned on the surface of the body of water. A first end of one or more mooring legs can be connected to the anchor structure. A second end of the one or more mooring legs can be connected to the floor of the body of water. The anchor structure can be lowered to a stable position below the surface of the body of water when the one or more mooring legs are connected thereto. The floating wind turbine support structure can be positioned above the anchor structure. The anchor structure and at least portion of the one or more mooring legs can be lifted such that the anchor structure can be connected to a mooring structure of the floating wind turbine support structure. The anchor structure can be connected to the mooring structure of the floating wind turbine support structure.

In other embodiments, a process for installing a floating wind turbine support structure can include laying a plurality of mooring legs on a floor of a body of water. An anchor structure that includes a buoyancy module can be positioned on the surface of the body of water. A first end of one or more mooring legs can be connected to the anchor structure. A second end of the one or more mooring legs can be connected to the floor of the body of water. The anchor structure can be maintained on the surface of the body of water when the one or more mooring legs are connected thereto. The floating wind turbine support structure can be positioned adjacent the anchor structure. The anchor structure can be connected to the floating wind turbine support structure.

BRIEF DESCRIPTION OF THE DRAWINGS

The various aspects and advantages of the preferred embodiment of the present invention will become apparent to those skilled in the art upon an understanding of the following detailed description of the invention, read in light of the accompanying drawings which are made a part of this specification.

DETAILED DESCRIPTION

Figures 1, 2:
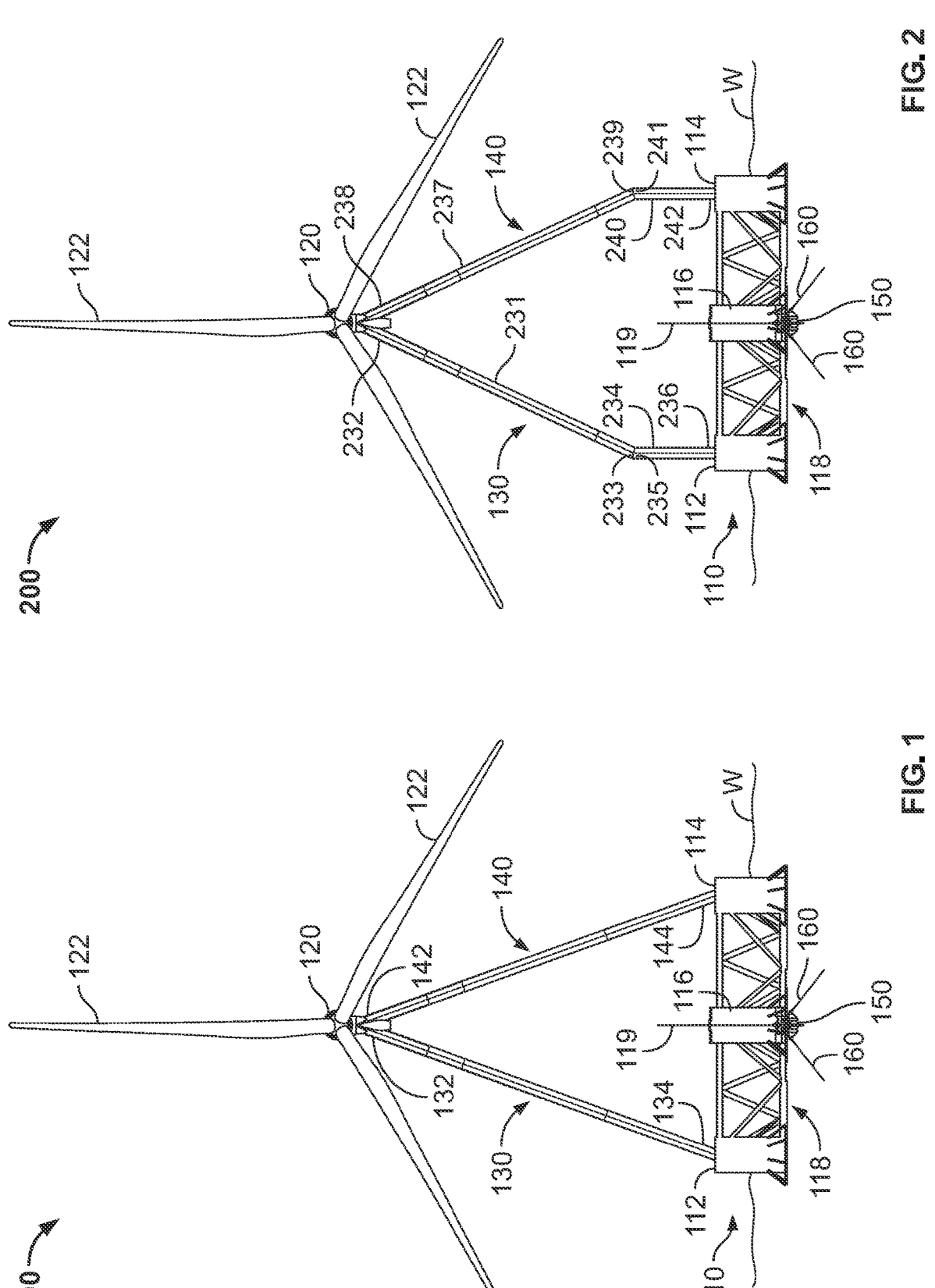
FIG. 1 depicts a front elevation view of an illustrative offshore wind turbine system that includes a support structure supporting a wind turbine, according to one or more embodiments described.
FIG. 2 depicts a front elevation view of another illustrative offshore wind turbine system that includes a support structure supporting a wind turbine, according to one or more embodiments described.

A detailed description will now be provided. Each of the appended claims defines a separate invention, which for infringement purposes is recognized as including equivalents to the various elements or limitations specified in the claims. Depending on the context, all references to the "invention", in some cases, refer to certain specific or preferred embodiments only. In other cases, references to the "invention" refer to subject matter recited in one or more, but not necessarily all, of the claims. It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows includes embodiments in which the first and second features are formed in direct contact and also includes embodiments in which additional features are formed interposing the first and second features, such that the first and second features are not in direct contact. The exemplary embodiments presented below may be combined in any combination of ways, i.e., any element from one exemplary embodiment may be used in any other exemplary embodiment, without departing from the scope of the disclosure. The figures are not necessarily drawn to scale and certain features and certain views of the figures can be shown exaggerated in scale or in schematic for clarity and/or conciseness.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Also, the naming convention used herein is not intended to distinguish between components that differ in name but not function. Furthermore, in the following discussion and in the claims, the terms "include", "including", "comprise", and "comprising" are used in an open-ended fashion, and thus should be interpreted to mean "include or including, but not limited to."

Further, the term "or" is intended to encompass both exclusive and inclusive cases, i.e., "A or B" is intended to be synonymous with "at least one of A and B," unless otherwise expressly specified herein. The indefinite articles "a" and "an" refer to both singular forms (i.e., "one") and plural referents (i.e., one or more) unless the context clearly dictates otherwise. The terms "up" and "down"; "upward" and "downward"; "upper" and "lower"; "upwardly" and "downwardly"; "above" and "below"; and other like terms used herein refer to relative positions to one another and are not intended to denote a particular spatial orientation since the offshore wind turbine system and/or components thereof may be equally effective at various angles or orientations.

FIG. 1 depicts a front elevation view of an illustrative offshore wind turbine system 100 that includes a floating wind turbine support structure or support structure 110 supporting a wind turbine generator 120, according to one or more embodiments. In some embodiments, the wind turbine generator 120 can be a horizontal axis wind turbine generator. In other embodiments, the wind turbine generator 120 can be a vertical axis wind turbine generator. The wind turbine generator 120 can include one or more blades (three are shown, 122) connected thereto. In some embodiments, the number of blades 122 can be 1, 2, 3, 4, 5, 6, or more.

The support structure 110 can be configured to float on a surface of a body of water W. The support structure 110 can include a first column 112, a second column 114, and a third column 116. It should be understood that the support structure 110 can include any number of columns, e.g., 3, 4, 5, 6, 7, 8, 9, 10, or more columns. The first, second, and third columns 112, 114, and 116, respectively, can be connected to one another via a truss assembly 118.

The wind turbine system 100 can also include a first support arm 130 and a second support arm 140. A first end 132 of the first support arm 130 and a first end 142 of the second support arm 140 can each be configured to support the wind turbine generator 120. A second end 134 of the first support arm 130 can be configured to connect to and be supported by the first column 112. A second end 144 of the second support arm 140 can be configured to connect to and be supported by the second column 114. In some embodiments, as shown in FIG. 1, the first and second support arms 130, 140 can form an A-frame type configuration. In other embodiments, not shown, a third support arm can be incorporated such that three support arms can support the wind turbine generator 120. For example, a first end of the third support arm can be configured to support the wind turbine generator and a second end of the third support arm can be configured to connect to and be supported by the third column 116.

In some embodiments, the plurality of blades 122 can be positioned between the first and second support arms 130, 140 and a central longitudinal axis 119 extending from the third column 116 such that the plurality of blades 122 can be located above the truss assembly 118, as shown in FIG. 1. In other embodiments, the first and second support arms 130, 140 can be positioned between the plurality of blades 122 and the central longitudinal axis 119 extending from the third column 116 such that the plurality of blades can be located above the surface of the water W.

The wind turbine system 100 can also include an anchor structure 150 that can be configured to be connected to the third column 116 of the support structure 110. The anchor structure 150 can also be configured to be connected to a floor or seabed of the body of water W via one or more mooring legs (two are shown, 160). In some embodiments, the anchor structure 150 can be configured to be substantially geostationary with respect to a rotation about a central longitudinal axis 119 through the anchor structure 150 when connected to the third column 116 and connected to the floor of the body of water W. As used herein, the term "substantially geostationary" means the anchor structure 150 can be configured to rotate less than +/−20 degrees, less than +/−16 degrees, less than +/−12 degrees, less than +/−8 degrees, less than or +/−4 degrees about the central longitudinal axis 119 and relative to a surface of the earth. It should be appreciated that a distance between the floor of the body of water W and the anchor structure 150, when connected to the third column 116, can increase and decrease due to wave action as the support structure 110 moves upward and downward with the surface of the body of water W. It should also be appreciated that the longitudinal axis 119 can be vertical with respect to the surface of the earth, but can also be non-vertical with respect to the surface of the earth as the support structure 110 pitches and rolls due to wave action. The anchor structure 150 can be connected to the third column 116 such that the support structure 110 can rotate relative to the anchor structure 150 when connected to thereto.

FIG. 2 depicts a front elevation view of another illustrative offshore wind turbine system 200 that includes the support structure 110 supporting the wind turbine 120, according to one or more embodiments. The wind turbine system 200 is substantially similar to the offshore wind turbine system 100 described above with reference to FIG. 1. The main difference is that the first support arm 130 and the second support arm 140 can include at least two segments or sections connected to one another. In some embodiments, the first support arm 130 can include a first segment or section 231 and a second segment or section 234 and the second support arm 140 can include a first segment or section 237 and a second segment or section 240. A first end 232 of the first section 231 and a first end 238 of the second section 237 can each be configured to support the wind turbine 120. A second end 233 of the first section 231 can be connected to a first end 235 of the second section 234 and a second end 239 of the second section 237 can be connected to a first end 241 of the second section 240. A second end 236 of the second section 234 can be configured to connect to and be supported by the first column 112. A second end 242 of the second section 240 can be configured to connect to and be supported by the second column 114. As shown in FIG. 2, the second sections 234, 240 can extend away from the first and second columns 112, 114, respectively, in a substantially vertical direction and the first sections 231, 237 can form an A-frame type configuration. The term "substantially vertical" means the second sections 234, 240 can be oriented within 0.5 degrees, 1 degree, 3 degrees, 5 degrees, 7 degrees, 9 degrees, 11 degrees, 13 degrees, 15 degrees, 17 degrees, or 20 degrees of an axis that is vertical with respect to a central longitudinal axis of the columns 112, 114, respectively.

Figure 3:
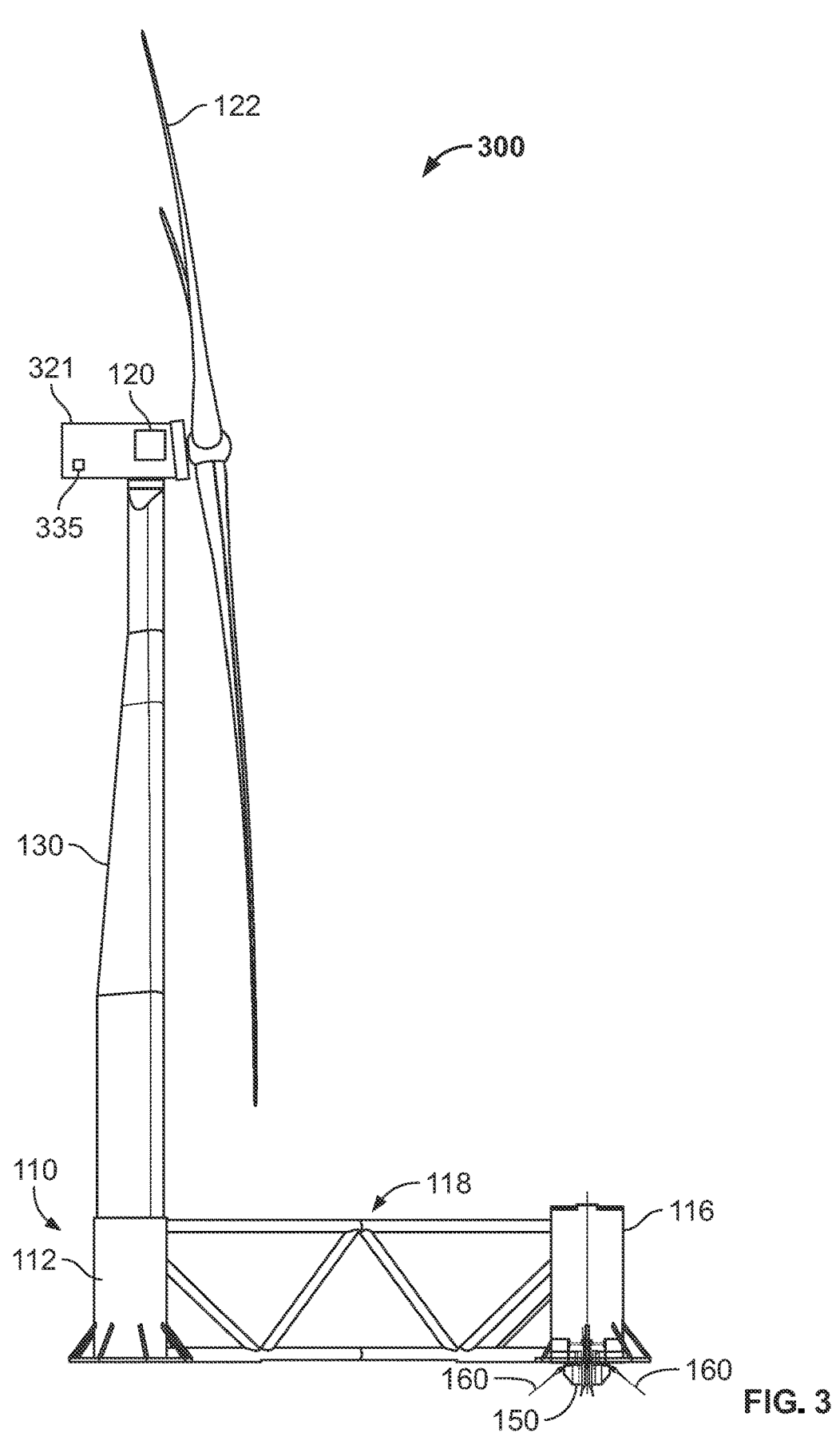
FIGS. 3 and 4 depict a side elevation view and a plan view, respectively, of an illustrative offshore wind turbine system that includes a support structure that supports a plurality of blades over the support structure, according to one or more embodiments described.
Figure 4:
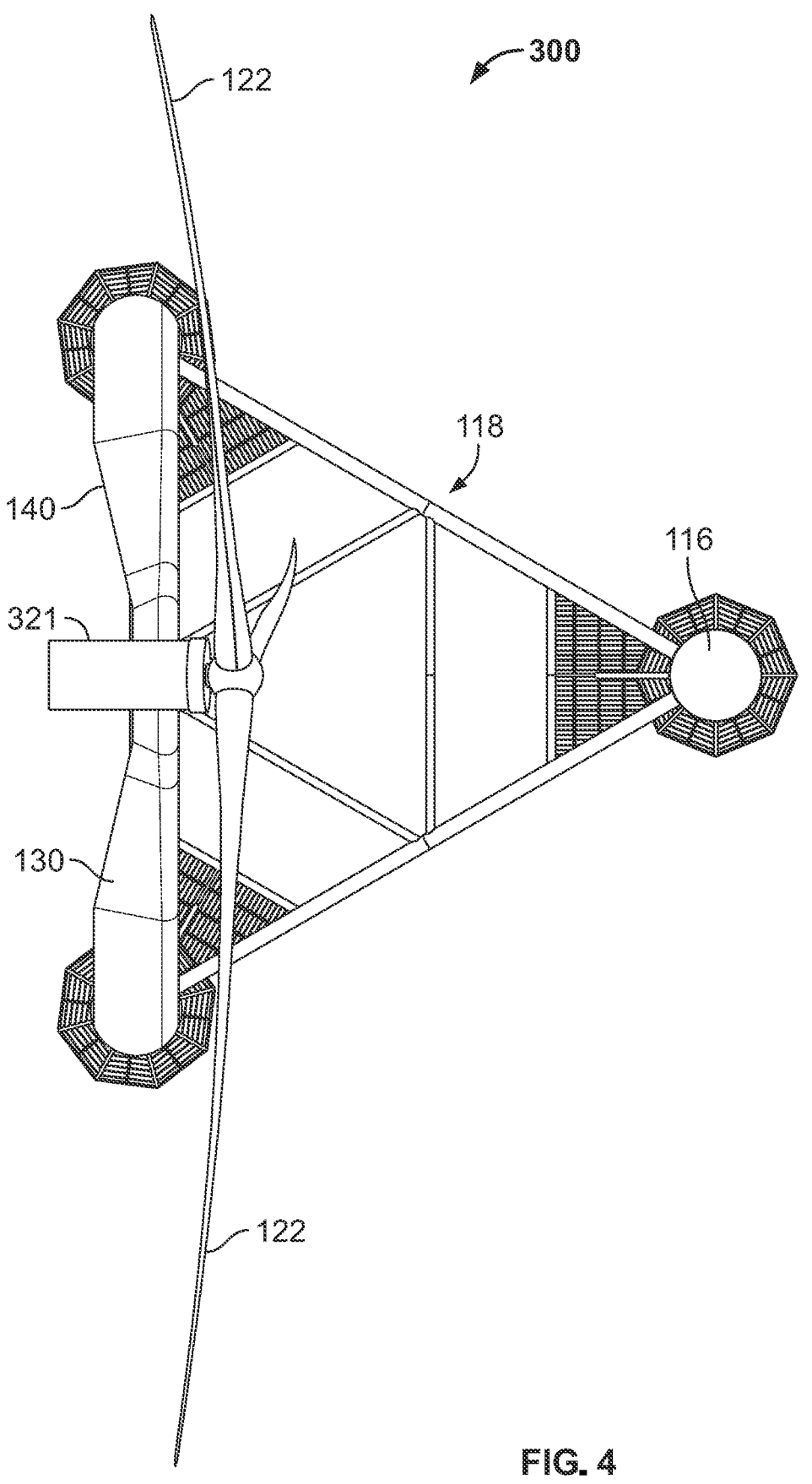
Figure 5:
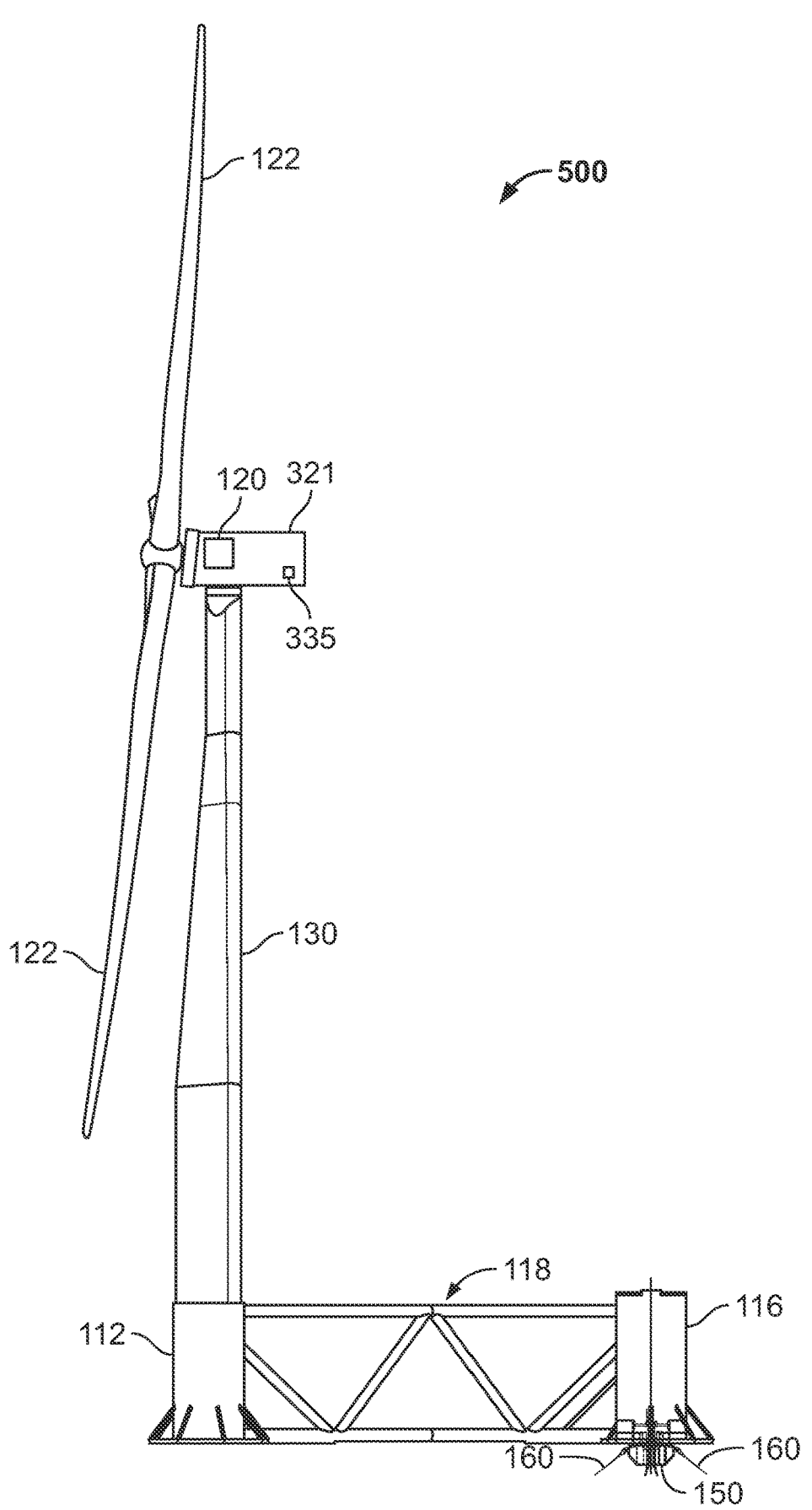
FIGS. 5 and 6 depict a side elevation view and a plan view, respectively, of an illustrative offshore wind turbine system that includes a support structure that supports a plurality of blades over water with respect to the support structure, according to one or more embodiments described.
Figure 6:
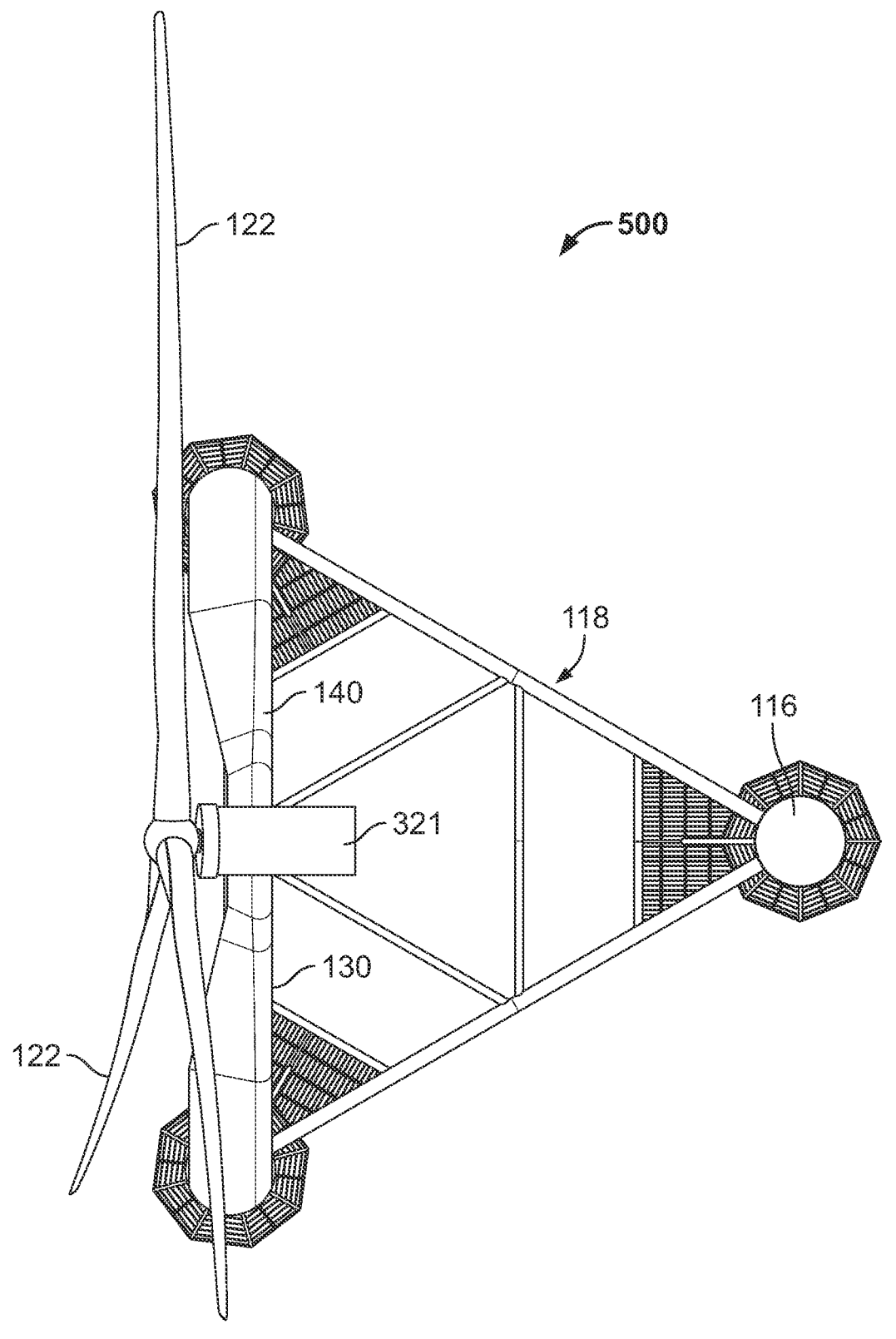

FIGS. 3 and 4 depict a side elevation view and a plan view, respectively, of an illustrative offshore wind turbine system 300 that includes the support structure 110 that supports the plurality of blades 122 over the support structure 110, according to one or more embodiments. In some embodiments, the wind turbine generator 120 can be at least partially disposed within a nacelle 321. FIGS. 5 and 6 depict a side elevation view and a plan view, respectively, of an illustrative offshore wind turbine system 500 that includes a support structure 110 that supports the plurality of blades 122 over water with respect to the support structure 110, according to one or more embodiments. In some embodiments, the wind turbine systems 300 and/or 500 can include a control system configured to adjust a pitch of the plurality of blades 122 during operation thereof.

Figure 7:
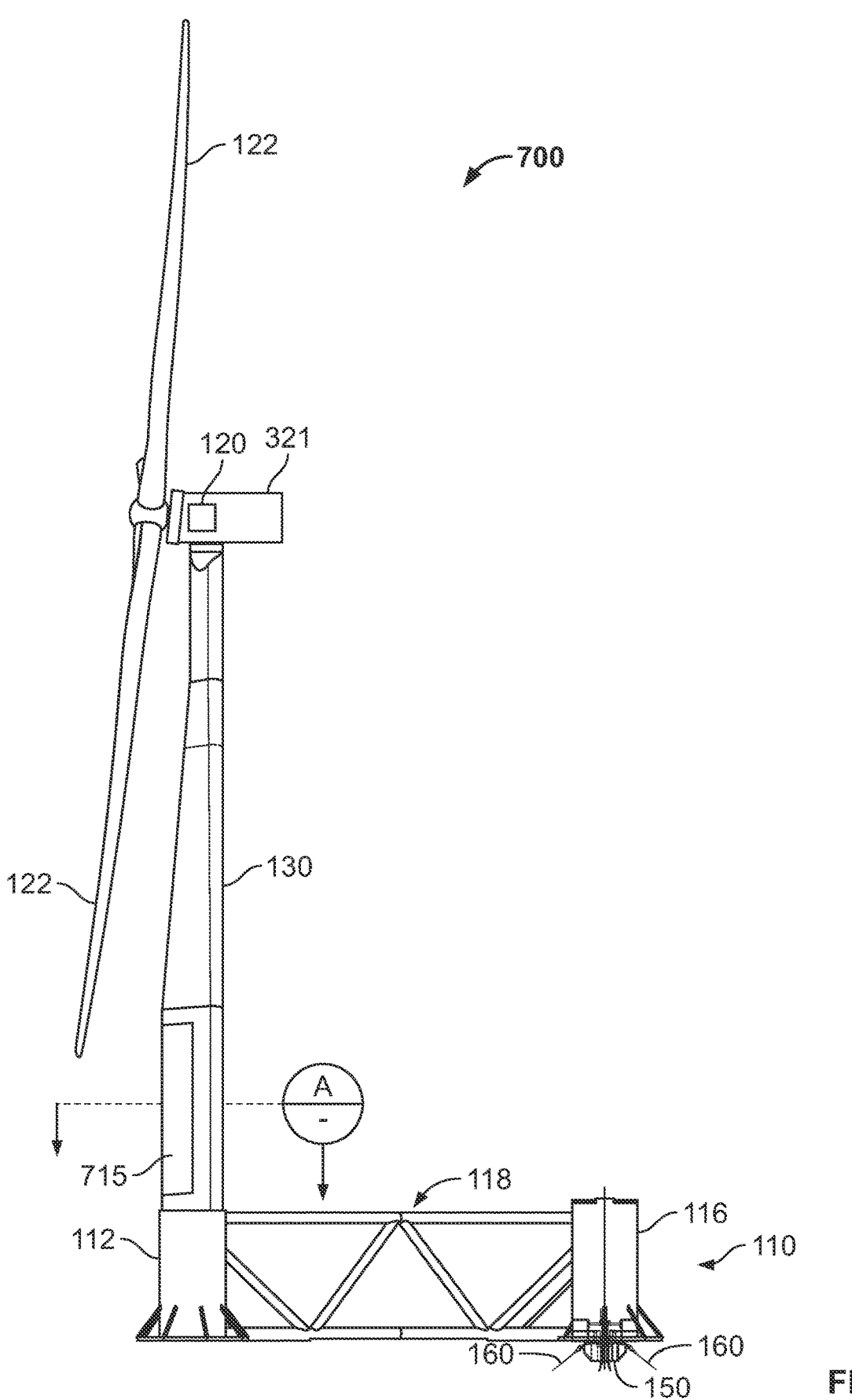
FIG. 7 depicts a side elevation view of another illustrative wind turbine system that includes one or more rudders configured to facilitate orientation of the system with respect to a wind direction during operation, according to one or more embodiments described.
Figure 8:
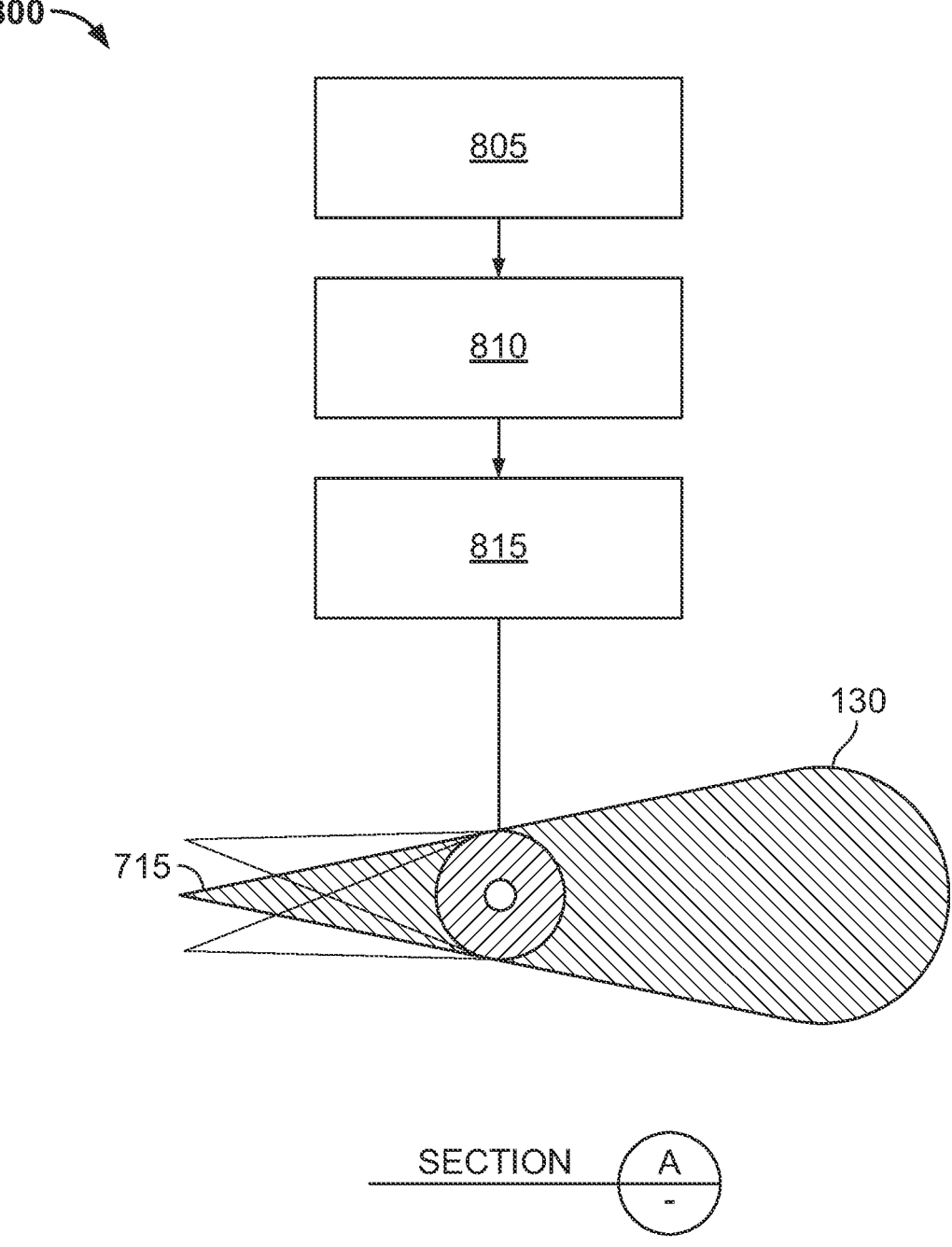
FIG. 8 depicts a cross-sectional view taken along section line A shown in FIG. 7 of the rudder in communication with a control system, according to one or more embodiments described.

FIG. 7 depicts a side elevation view of another illustrative wind turbine system 700 that includes one or more rudders 715 configured to facilitate orientation of the system 700 with respect to a wind direction during operation, according to one or more embodiments. FIG. 8 depicts a cross-sectional view taken along section line A shown in FIG. 7 in communication with a control system 800, according to one or more embodiments. In some embodiments, the first and second support arms 130, 140 can each include one or more rudders 715.

In some embodiments, the control system 800 can include one or more sensors 805, a control module 810, and a servomechanism 815. The sensor 805 can provide data such as a direction of wind and/or an orientation of the support structure 110 during operation of the wind turbine system 700. The data generated by the sensor 805 can be received by the control module 810. The control module 810 can process the data and output a control signal to the servomechanism 815. The control module 810 can process one or more control algorithms that can be used to operate the wind turbine system 700. Illustrative control algorithms can be or can include, but are not limited to, a survival mode, a normal operating mode, and/or a maintenance mode.

During operation, if an angle between a wind heading and a wind turbine heading exceeds a pre-determined threshold, the control system 800 can be activated and the control algorithm can be configured to rotate the rudder 715 so that the rudder 715 and support arms 130, 140 can generate a correcting yaw moment to align the wind turbine system 700 with the wind. During survival mode, the same mechanism can be activated to reduce wind load on feathered wind turbine blades 122. In some embodiments, the control system can be a proportional-integral-derivative controller (PID controller). The PID controller can be a control loop mechanism employing feedback that is widely used in industrial control operations. The proportional, integral and derivative terms of the control scheme can be tuned based on numerical simulation and model test results. The control signal generated by the control module 810 can direct the servomechanism 815 as to how the rudders 715 should be oriented with respect to the first and second support arms 130, 140. The servomechanism can be a mechanical servomechanism or a hydraulic servomechanism. The rudder(s) 715 can facilitate rotative alignment of the support structure 110 with a wind direction during operation of the wind turbine system 700. In some embodiments, the nacelle 321 can be free of a control system configured to orientate the wind turbine blades 122 with respect to an incident wind direction.

Figure 9:
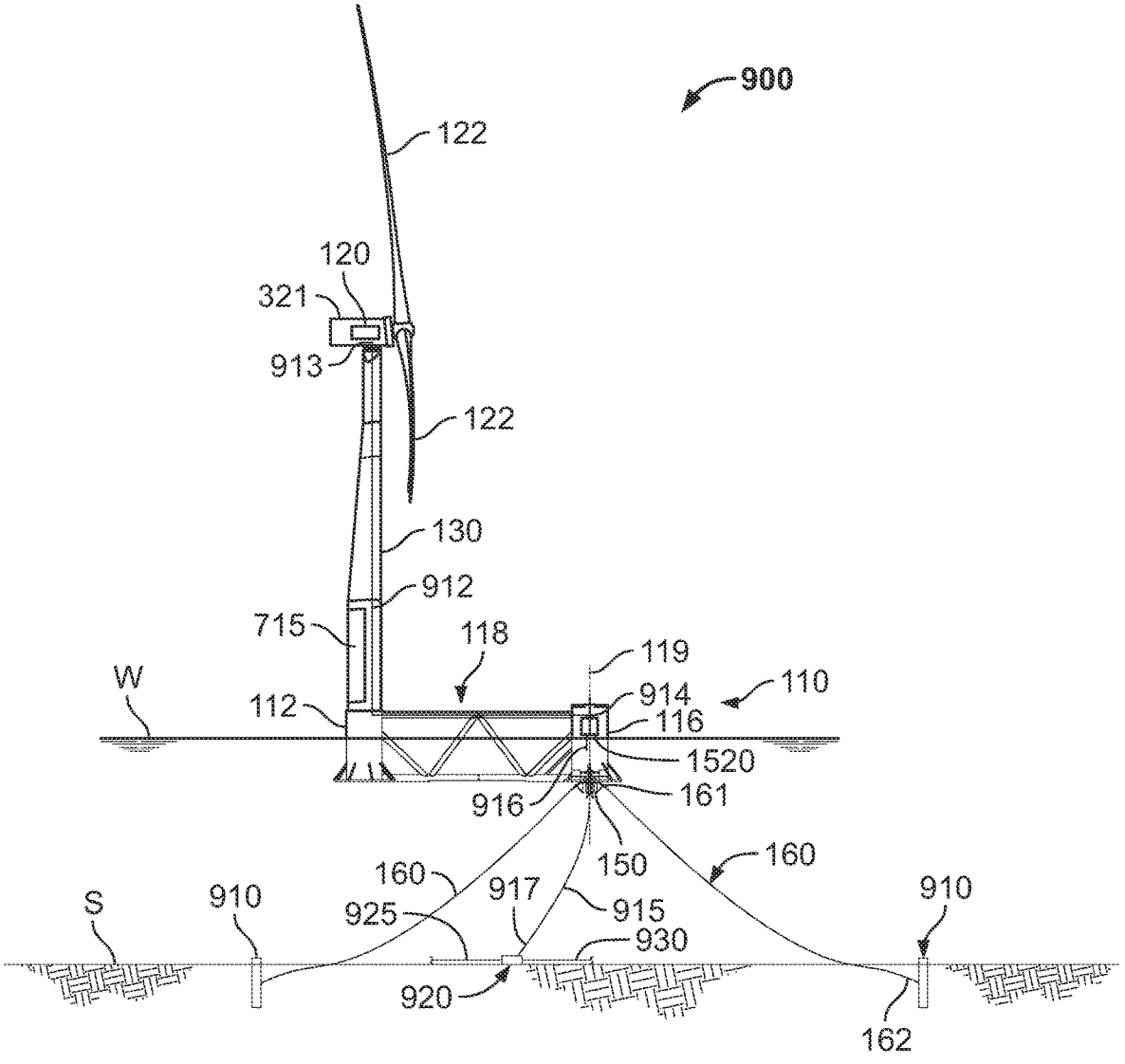
FIG. 9 depicts a side elevation view of another illustrative wind turbine system floating on a surface of a body of water configured to weathervane about an anchor structure connected thereto and electrically connected to a junction box located on a floor or seabed of the body of water, according to one or more embodiments described.

FIG. 9 depicts a side elevation view of another illustrative wind turbine system 900 floating on a surface of a body of water W configured to weathervane about the anchor structure 150 connected thereto and electrically connected via a subsea cable 915 to a junction box 920 located on a floor or seabed S of the body of water W, according to one or more embodiments. The wind turbine generator 120 can be electrically connected via cable 912 to the subsea cable 915 via an electrical slip ring 1520 (see FIGS. 15-19 described in more detail below). A first end 913 of the cable 912 can be connected to the wind turbine generator 120 and a second end 914 of the cable 915 can be connected to the electrical slip ring 1520. In some embodiments, a first end 916 of the subsea cable 915 can be connected to the electrical slip ring 1520 and a second end 917 of the subsea cable 915 can be connected to the junction box 920. The subsea cable 915 can be any cable suitable for transferring electricity produced by the wind turbine generator 120 during operation of the wind turbine system 900 to the junction box 920. In other embodiments, the second end 917 of the subsea cable 915 can be routed to an onshore facility or any other location configured to receive the electricity generated by the wind turbine system 900.

In some embodiments, one or more additional subsea cables 930 that can provide electricity from one or more additional wind turbine systems can also be connected to the junction box 920. The junction box 920 can connect the subsea cable 915 and, if present, the additional subsea cable(s) 930 to a subsea cable 925 that can be connected to one or more additional wind turbine systems, an onshore facility, or other facility configured to receive the electricity generated by the wind turbine system 900. In other embodiments, the additional subsea cable 930, if present, can be routed into the third column 116 and connected therein, e.g., within a junction box located within the third column 116 or to a fixed part of the electrical slip ring 1520, such that junction box 920 can be eliminated.

The anchor structure 150 can be secured to the seabed S via the mooring legs 160. A first end 161 of each leg of the mooring legs 160 can be connected to the anchor structure 150 and a second end 162 of each leg of the mooring legs 160 can be connected to the floor or seabed S of the body of water W. In some embodiments, the second ends 162 of the mooring legs 160 can be connected to the floor or seabed S of the body of water W via seabed anchor 910. The seabed anchor(s) 910 can be a drag embedment anchor, a suction pile, a gravity anchor, a driven pile, or any combination thereof. The particular configuration of the seabed anchor(s) 910 can be based, at least in part, on the type of seabed S, e.g., soil conditions, at the site and the loading expected to be applied on the seabed anchor(s) 910 when connected to the anchor structure 150 via the mooring legs 160.

Figure 10:
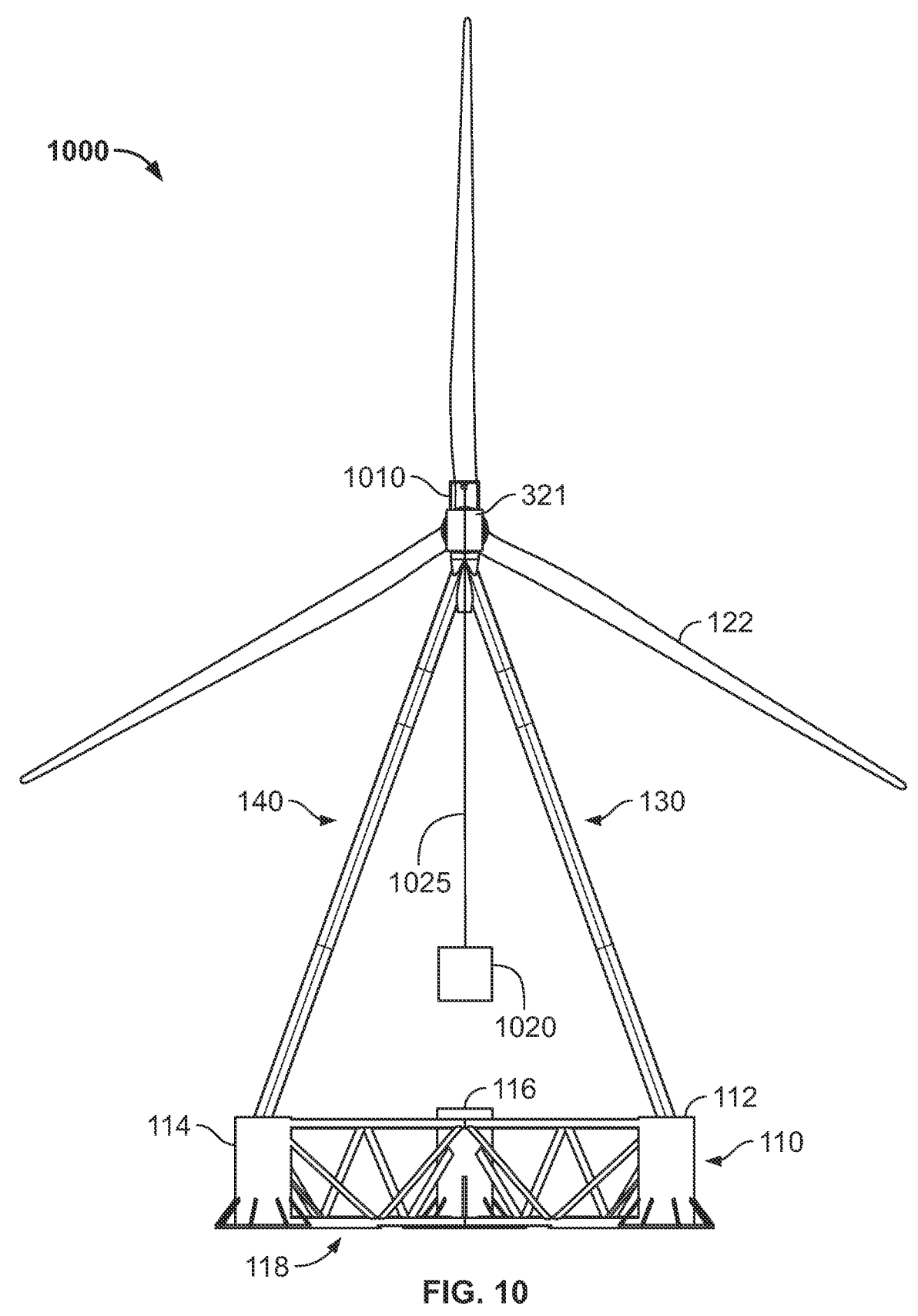
FIGS. 10 and 11 depict a back elevation view and a side elevation view of an illustrative wind turbine system that includes a hanging winch cart configured to raise and lower equipment to and from a nacelle, according to one or more embodiments described.
Figure 11:
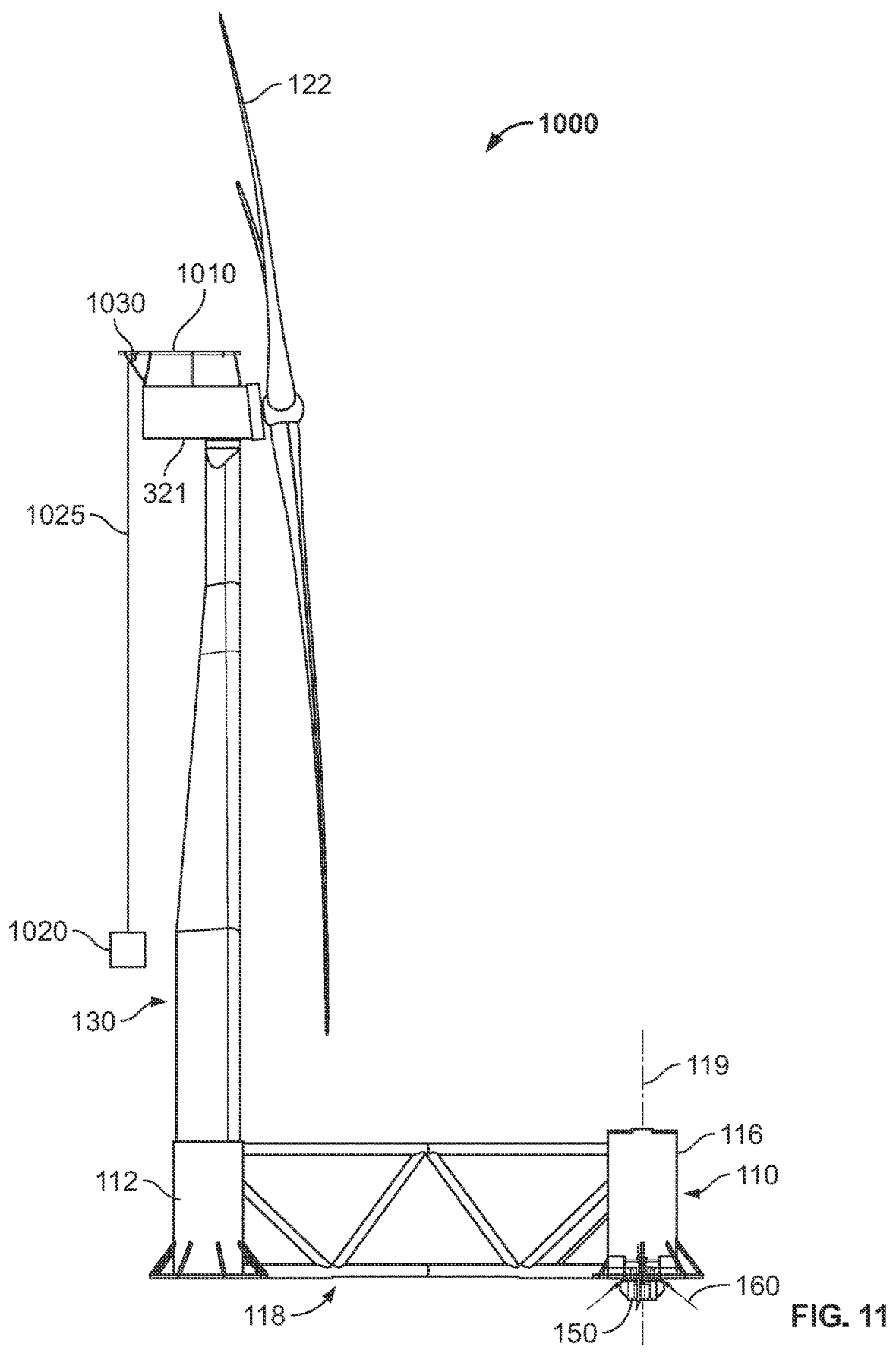
Figure 12:
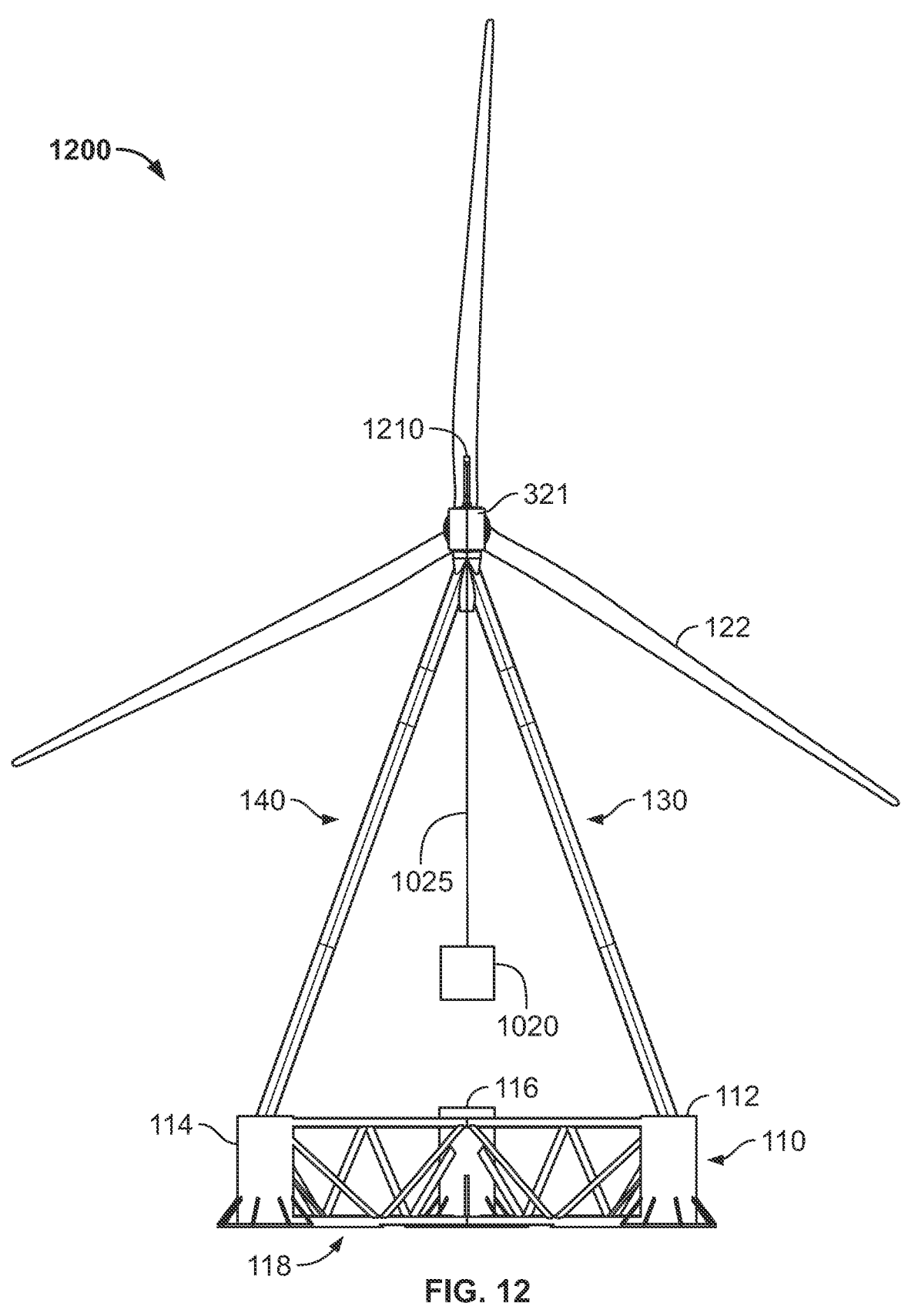
FIGS. 12 and 13 depict a back elevation view and a side elevation view of an illustrative wind turbine system that includes a jib crane lifting system configured to raise and lower equipment to and from a nacelle, according to one or more embodiments described.
Figure 13:
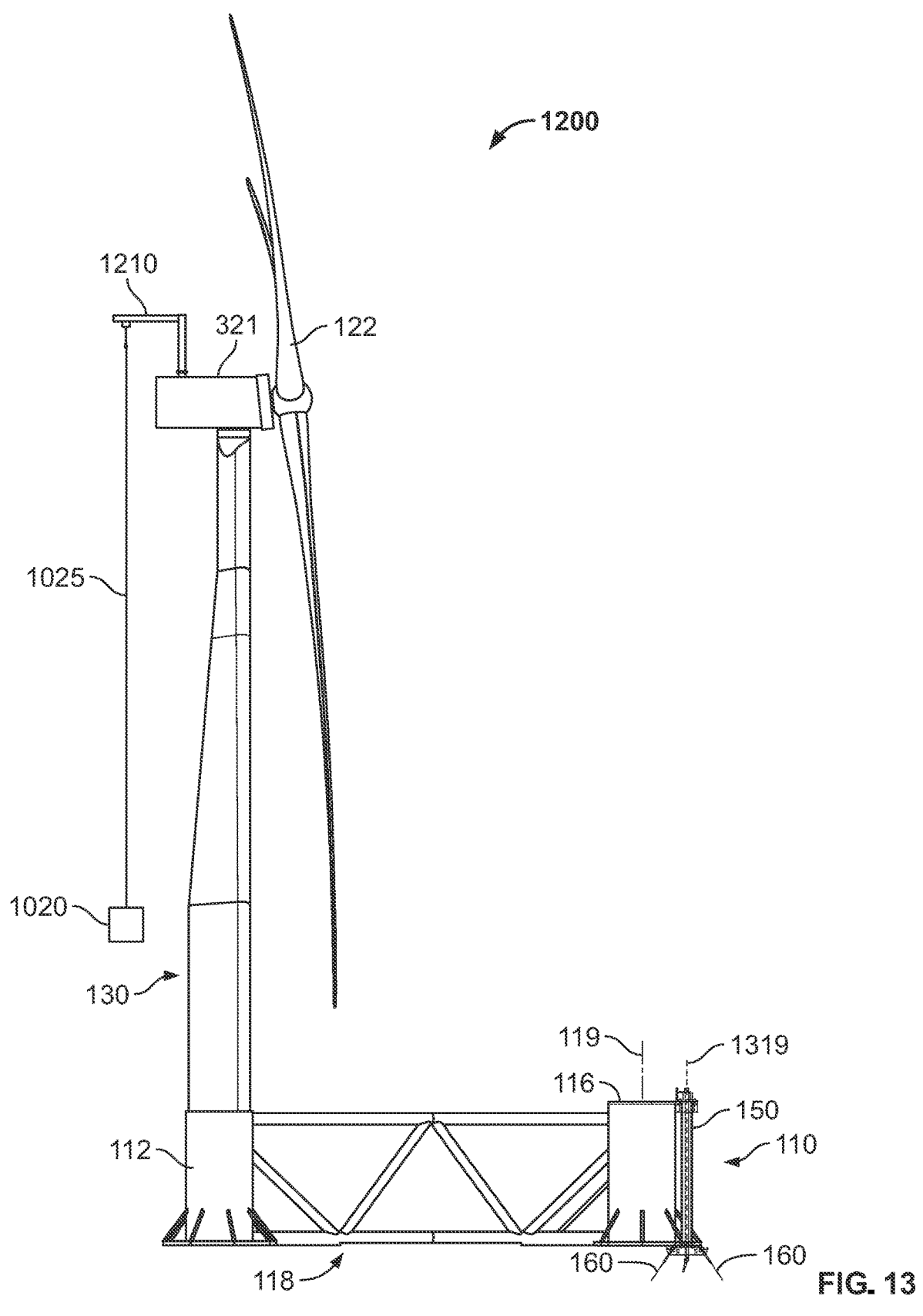

FIGS. 10 and 11 depict a back elevation view and a side elevation view, respectively, of an illustrative wind turbine system 1000 that includes mechanical handling equipment, e.g., a hanging winch cart 1010, as shown, that can be configured to raise and lower equipment 1020 to and from the nacelle 321 via a cable, chain, rope, or other line 1025, according to one or more embodiments. In some embodiments, the mechanical handling equipment can include one or more pulleys that can include a sheave 1030 that can be movable on top of the nacelle 321. FIGS. 12 and 13 depict a back elevation view and a side elevation view, respectively, of an illustrative wind turbine system 1200 that includes mechanical handling equipment, e.g., a jib crane lifting system 1210, configured to raise and lower equipment 1020 to and from the nacelle 321 via a cable, chain, rope, or other line 1025, according to one or more embodiments. The mechanical handling equipment 1010, 1210 can be configured to facilitate the installation of and/or the removal of the plurality of blades 122, the wind turbine generator 120, a gear box, a controller, a transformer, a rotor shaft, a brake assembly, or other component inside the nacelle 321 when the support structure 110 is floating on the surface of the body of water W. In some embodiments, the mechanical handling equipment can be or can include, but is not limited to, the hanging winch cart 1010, the jib crane lifting system 1210, a platform capable of being elevated above the support structure 110, or any other mechanical handling equipment. In some embodiments, the mechanical handling equipment can be disposed on or connected to the support structure 110, the first support arm 130, the second support arm 140, the nacelle 321, or any combination thereof.

As shown in FIG. 11, the anchor structure 150 can be connected to a bottom of the third column 116 such that the central longitudinal axis 119 of the column 116 and the anchor structure 150 can be aligned with one another. As shown in FIG. 13, the anchor structure 150 can be connected to an exterior of the third column 116 and such configuration can also be referred to as the anchor structure 150 being bow mounted to the third column 116. In such embodiment, a central longitudinal axis 1319 of the anchor structure 150 can be offset and parallel with the central longitudinal axis 119 of the third column 116.

Figure 14:
FIG. 14 depicts a front elevation view of an illustrative offshore wind turbine system that includes a support structure supporting a tower and a wind turbine, according to one or more embodiments described.

FIG. 14 depicts a front elevation view of an illustrative offshore wind turbine system 1400 that includes a support structure 110 supporting a tower 1410 and a wind turbine generator 120, according to one or more embodiments. The wind turbine generator can include a plurality of blades 122 connected thereto. A first end 1412 of the tower 1410 can support the wind turbine generator 120 at an elevation above the support structure 110. The support structure 110 can include a first column 112, a second column 114, and a third column 116. It should be understood that that the support structure 110 can include any number of columns, e.g., 3, 4, 5, 6, 7, 8, 9, 10, or more columns. The first, second, and third columns 112, 114, and 116, respectively, can be connected to one another by a truss assembly 118.

The wind turbine system 1400 can also include a first support arm 130 and a second support arm 140. The first end 132 of the first support arm 130 and the first end 142 of the second support arm 140 can each be configured to support a second end 1414 of the tower 1410. In some embodiments, the first end 132 of the first support arm 130 and the first end 142 of the second support arm 140 can each be configured to support a platform 1420 upon which the second end 1414 of the tower 1410 can be supported. The second end 134 of the first support arm 130 can be configured to connect to and be supported by the first column 112. The second end 144 of the second support arm 140 can be configured to connect to and be supported by the second column 114. In some embodiments, as shown in FIG. 14, the first and second support arms 130, 140 can form an A-frame type configuration. In other embodiments, the first support arm 130 and the second support arm 140 can include at least two segments or sections connected to one another as discussed and described above with reference to FIG. 2. In some embodiments, not shown, a third support arm can be incorporated such that three support arms support the tower 1410. For example, a first end of the third support arm can be configured to support the second end 1414 of the tower 1410 or the platform 1420 and the second end of the third support arm can be configured to connect to and be supported by the third column 116.

In some embodiments, the plurality of blades 122 can be positioned between the first and second support arms 130, 140 and a central longitudinal axis 119 extending from the third column 116 such that the plurality of blades 122 can be located above the truss assembly 118, e.g., as shown in FIGS. 3 and 4. In other embodiments, the first and second support arms 130, 140 can be positioned between the plurality of blades 122 and the central longitudinal axis 119 extending from the third column 116 such that the plurality of blades can be located above the surface of the water W, e.g., as shown in FIGS. 5 and 6.

Figure 15:
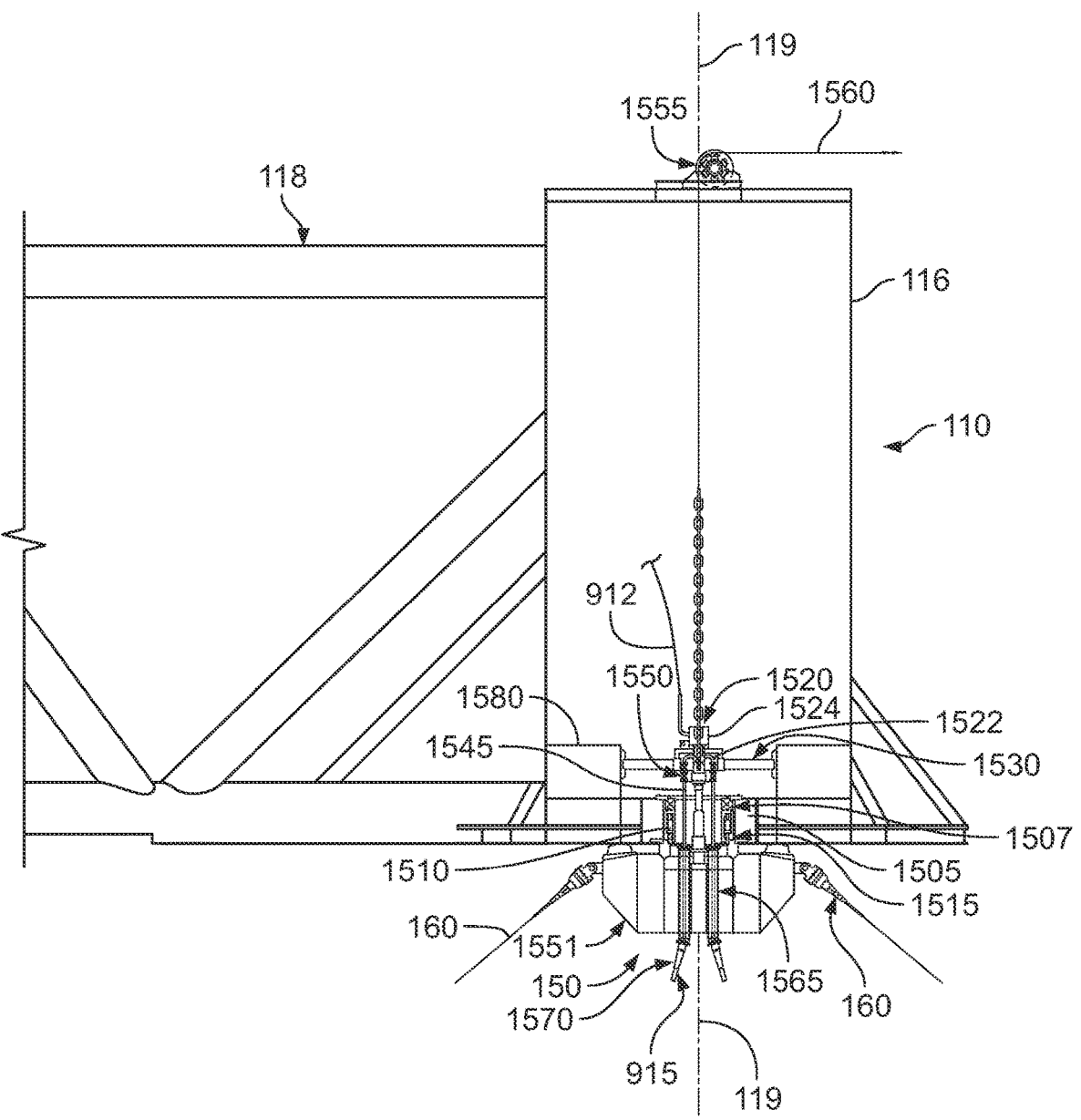
FIG. 15 depicts an elevation view in cross-section of an illustrative column of a support structure that is releasably connected to an illustrative anchor structure such that the support structure is rotatable relative to the anchor structure, according to one or more embodiments described.

FIG. 15 depicts an elevation view in cross-section of an illustrative third column 116 of the support structure 110 that is releasably connected to an illustrative anchor structure 150 such that the support structure 110 is rotatable relative to the anchor structure 150, according to one or more embodiments. In some embodiments, a mooring structure 1505 can be rotatively connected to the third column 116 of the support structure 110. In some embodiments, the mooring structure 1505 can be rotatively connected to the third column 116 via one or more bearings 1507. In some embodiments, the bearing 1507 can be any suitable mechanical bearing, e.g., a 3-row roller bearing, a wheel and rail type bearing, a plane bearing system, or a bushing type bearing system. The mooring structure 1505 can be configured to fixedly connect to the anchor structure 150. In some embodiments, the mooring structure 1505 can be fixedly connected to the anchor structure 150 via actuation of one or more pistons, cylinders, or actuators 1510 that can move a ring or other connection element 1515 into an engaged position with respect to the anchor structure 150.

The third column 116 can also include an electrical slip ring 1520 that includes a fixed part 1522 and a rotating part 1524 rotatively connected together. The fixed part 1522 of the electrical slip ring 1520 can be configured to be connected to the mooring structure 1505. The rotating part 1524 of the electrical slip ring 1520 can be configured to be connected to the third column 116. The electrical slip ring 1520 can be configured to maintain electrical continuity between the fixed part 1522 and the rotating part 1524 during rotation therebetween. A first end of the cable 912 can be connected to the wind turbine generator 120 (see FIG. 9) and a second end of the cable 912 can be connected to the rotating part 1524 of the electrical slip ring 1520. A first end 1545 of the subsea cable 915 can be connected to the fixed part 1522 of the electrical slip ring 1520 and a second end of the subsea cable 915 can be connected to a subsea junction box, an onshore facility, or other facility configured to receive or supply the electricity generated by the wind turbine systems 100, 200, 300, 500, 700, 900, 1000, 1200, 1400 described herein. The first end 1545 of the subsea cable 915 can be connected to the fixed part 1522 of the electrical slip ring 1520 via a connection assembly 1550. It should be understood, in some embodiments, two or more wind turbine systems can be daisy chained together. In such embodiments, at least one wind turbine system can be configured to receive electricity generated from one or more wind turbine systems and can be configured to send that received electricity along with electricity generated by the at least one wind turbine system further down the chain or to an onshore facility or other facility configured to receive the electricity generated by the two or more wind turbine systems.

In some embodiments, the third column 116 can include an electrical swivel access platform 1530. The electrical swivel access platform 1530 can be configured to rotate with the rotating part 1524 of the electrical slip ring 1520. The electrical swivel access platform 1530 can be used to facilitate connection and disconnection of the anchor structure 150 to and from the mooring structure 1505 and/or to carry out maintenance operations.

The anchor structure 150 can include one or more cable guide tubes 1565 configured to facilitate passage of the subsea cable 915 through the anchor structure 150 to connect to the fixed part 1522 of the electrical slip ring 1520 via the connection assembly 1550. The anchor structure 150 can also include a cable bend stiffener 1570 that can be configured to prevent over stressing or over bending of the electrical cable 915 to reduce fatigue and/or wear on the subsea cable 915 extending from the anchor structure 150.

The third column 116 can also include one or more sheaves 1555 that can be configured to receive and guide a pull-in/let-out line 1560 that can be connected to a chain jack, a strand jack, a linear winch, a rotary winch, or other lifting/lowering device configured to raise the anchor structure 115 into an engagement position with respect to the mooring structure 1505 and to lower the anchor structure 115 into a disengaged position with respect to the mooring structure 1505. In some embodiments, the lifting/lower device can be disposed on the third column 116. In other embodiments, the lifting/lowering device can be disposed on a vessel that can connect to the pull-in/let-out line 1560 during installation, maintenance, and/or decommissioning of the wind turbine systems 100, 200, 300, 500, 700, 900, 1000, 1200, 1400 described herein.

In some embodiments, the anchor structure 150 can include a buoyancy module 1551. The anchor structure 150 can be configured to receive and support the first end of the subsea cable 915 such that, when the subsea cable 915 is disconnected from the fixed part 1522 of the electrical slip ring 1520, the subsea cable 915 is supported by the anchor structure 150. When the anchor structure 150 is disconnected from the mooring structure 1505 and the first end of the subsea cable 915 is disconnected from the fixed part 1522 of the electrical slip ring 1520, the buoyancy module 1551 can be configured to float at an equilibrium position below the surface of the body of water W when the first end of each mooring leg 160 is connected to the buoyancy module 1551 and the second end of each mooring leg is connected to the floor of the body of water S. In some embodiments, when the anchor structure 150 is connected to the mooring structure 1505, the anchor structure 150 can form part of the third column 116.

In some embodiments, a ballast medium 1580 can be disposed within the third column 116. Similarly, a ballast medium 1580 can also be disposed within the first column 112 and/or the second column 114 and/or the truss assembly 118. In some embodiments, a volume of the ballast medium 1580 disposed within the support structure 110 can remain constant during operation of the wind turbine system. In some embodiments, a center of gravity of the ballast medium 1580 and/or an amount of the ballast medium 1580 within the support structure 110 can remain constant during operation of the wind turbine systems 100, 200, 300, 500, 700, 900, 1000, 1200, 1400 described herein. In some embodiments, the volume of the ballast medium 1580 and the center of gravity of the ballast medium 1580 disposed within the support structure 110 can remain constant during operation of the wind turbine systems 100, 200, 300, 500, 700, 900, 1000, 1200, 1400 described herein.

Figure 16:
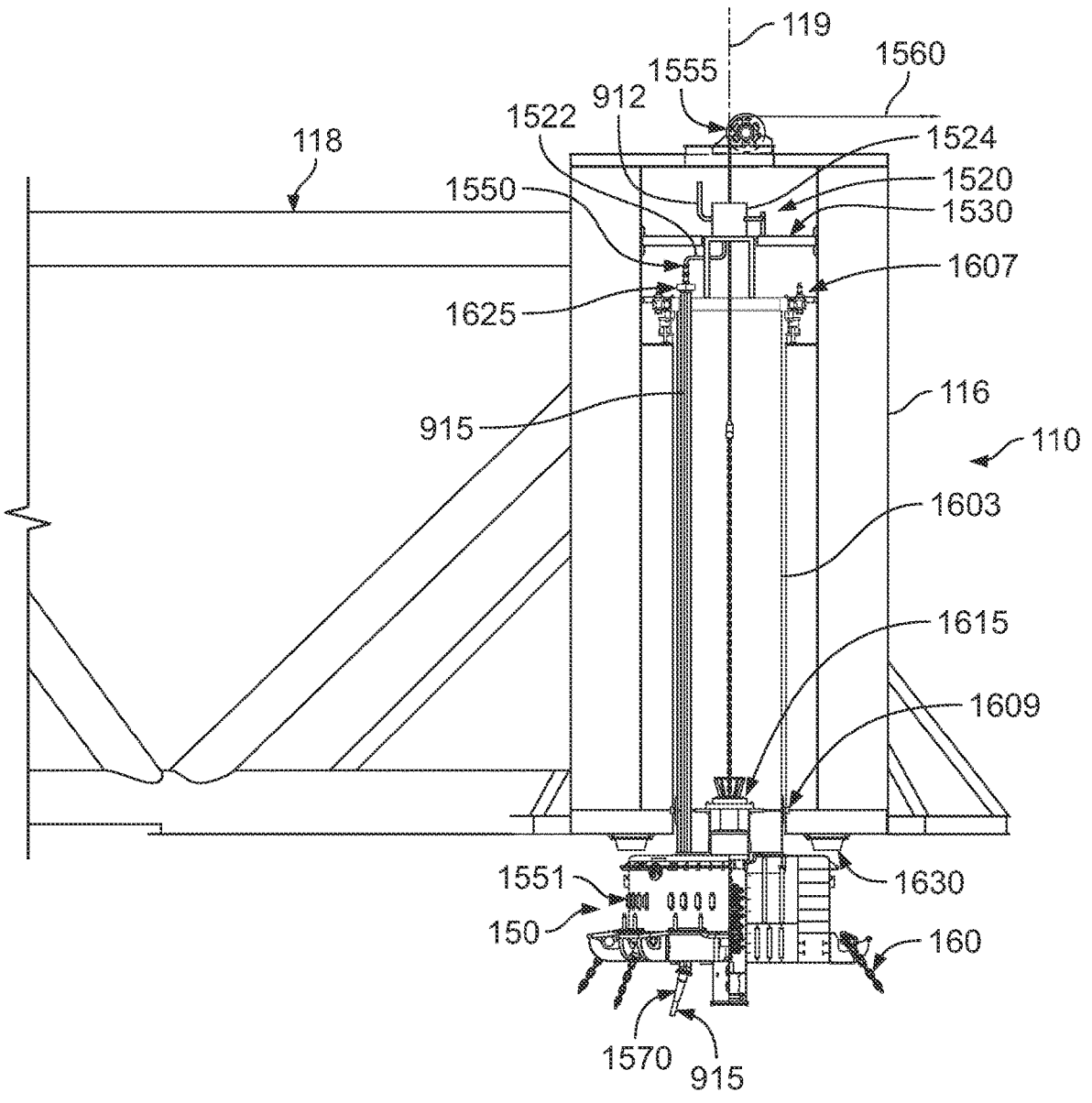
FIG. 16 depicts an elevation view in cross-section of another illustrative column of a support structure that is connected to an illustrative anchor structure such that the support structure is rotatable relative to the anchor structure, according to one or more embodiments described.

FIG. 16 depicts an elevation view in cross-section of another illustrative column 116 of a support structure 110 that is connected to an illustrative anchor structure 150 such that the support structure 110 is rotatable relative to the anchor structure 150, according to one or more embodiments. In some embodiments, a mooring structure 1603 can be rotatively connected to the third column 116 of the support structure 110. In some embodiments, the mooring structure 1603 can be rotatively connected to the third column 116 via one or more bearings, e.g., an upper bearing 1607 and a lower bearing 1609. In some embodiments, the bearings 1607, 1609 can be any suitable mechanical bearing, e.g., a 3-row roller bearing, a wheel and rail type bearing, a plane bearing system, or a bushing type bearing system. The mooring structure 1603 can be configured to fixedly connect to the anchor structure 150. In some embodiments, the mooring structure 1603 can be connected to the anchor structure 150 via connector 1615. The connector 1615 can be releasable such that the anchor structure 150 can be disconnected from the mooring structure 1603, e.g., to tow the wind turbine system to an onshore facility for maintenance.

The third column 116 can also include an electrical slip ring 1520 that includes a fixed part 1522 and a rotating part 1524 rotatively connected together. The fixed part 1522 of the electrical slip ring 1520 can be connected to the mooring structure 1603. The rotating part 1524 of the electrical slip ring 1520 can be connected to the third column 116. The electrical slip ring 1520 can be configured to maintain electrical continuity between the fixed part 1522 and the rotating part 1524 during rotation therebetween. A first end of the cable 912 can be connected to the wind turbine generator 120 (see FIG. 9) and a second end of the cable 912 can be connected to the rotating part 1524 of the electrical slip ring 1520. A first end of the subsea cable 915 can be connected to the fixed part 1522 of the electrical slip ring 1520 and a second end of the subsea cable 915 can be connected to the junction box 920 (FIG. 9), an onshore facility, or other facility configured to receive the electricity generated by the wind turbine systems 100, 200, 300, 500, 700, 900, 1000, 1200, 1400 described herein. The first end of the subsea cable 915 can be connected to the fixed part 1522 of the electrical slip ring 1520 via a connection assembly 1550. In some embodiments, a cable support 1625 can be used to support a weight of the cable 915 within the third column 116.

In some embodiments, the third column 116 can include an electrical swivel access platform 1530. The electrical swivel access platform 1530 can be configured to rotate with the rotating part 1524 of the electrical slip ring 1520. The electrical swivel access platform 1530 can be used to facilitate connection and disconnection of the anchor structure 150 to and from the mooring structure 1603 and/or to carry out maintenance operations.

The third column 116 can also include one or more sheaves 1555 that can be configured to receive and guide a pull-in/let-out line 1560 that can be connected to a chain jack, a strand jack, a linear winch, a rotary winch, or other lifting/lowering device configured to raise the anchor structure 115 into an engagement position with respect to the mooring structure 1603 and to lower the anchor structure 115 into a disengaged position with respect to the mooring structure 1603. In some embodiments, the lifting/lower device can be disposed on the third column 116. In other embodiments, the lifting/lowering device can be disposed on a vessel that can connect to the pull-in/let-out line 1560 during installation, maintenance, and/or decommissioning of the wind turbine systems 100, 200, 300, 500, 700, 900, 1000, 1200, 1400 described herein.

In some embodiments, the anchor structure 150 can include a buoyancy module 1551. The buoyancy module 1551 can be configured to receive and support the first end of the subsea cable 915 in a cable support (not shown) such that when the subsea cable 915 is disconnected from the fixed part 1522 of the electrical slip ring 1520, the subsea cable 915 can be supported by the cable support in the buoyancy module 1551. When the anchor structure 150 is disconnected from the mooring structure 1603 and the first end of the subsea cable 915 is disconnected from the fixed part 1522 of the electrical slip ring 1520, the buoyancy module 1551 can be configured to float at an equilibrium position below the surface of the body of water W when the first end 161 of each mooring leg 160 is connected to the buoyancy module 1551 and the second end of each mooring leg is connected to the floor of the body of water S. In some embodiments, when the anchor structure 150 is connected to the mooring structure 1603, the anchor structure 150 can form part of the third column 116. One or more bumpers 1630 can be disposed on a bottom of the column 116 and/or on the top of the anchor structure 150. The bumper 1630 can absorb or reduce impact forces between the anchor structure 150 and the support structure 110 during a lifting or lowering operation.

Figure 17:
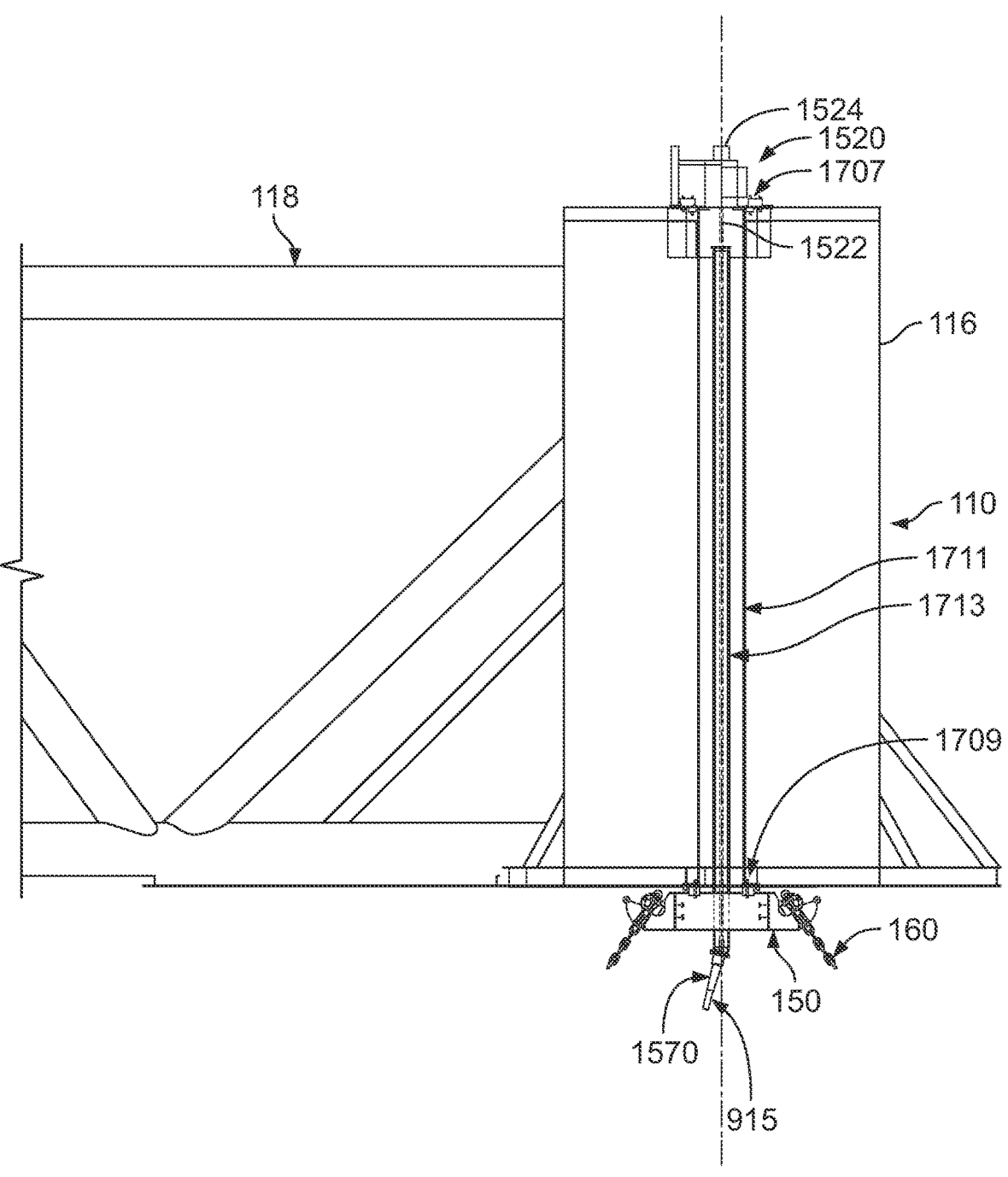
FIG. 17 depicts an elevation view in cross-section of another illustrative column of a support structure that is connected to an illustrative anchor structure such that the support structure is rotatable relative to the anchor structure, according to one or more embodiments described.

FIG. 17 depicts an elevation view in cross-section of another illustrative third column 116 of a support structure 110 that is connected to an illustrative anchor structure 150 such that the support structure 110 is rotatable relative to the anchor structure 150, according to one or more embodiments. The anchor structure 150 depicted in FIG. 17 is configured to be permanently connected to the third column 116. The anchor structure 150 can be fixedly connected to a mooring structure 1711 that can extend from a bottom or first end of the third column 116 to a top or second end of the third column 116. The mooring structure 1711 can be rotatively connected to the third column 116 via one or more bearings, e.g., an upper bearing 1707 and a lower bearing 1709. In some embodiments, the bearings 1707, 1709 can be any suitable mechanical bearing, e.g., a 3-row roller bearing, a wheel and rail type bearing, a plane bearing system, or a bushing type bearing system. In some embodiments, the upper bearing 1707 can be a 3-row roller bearing and the lower bearing 1709 can be a bushing.

The third column 116 can also include an electrical slip ring 1520 that includes a fixed part 1522 and a rotating part 1524 rotatively connected together. The fixed part 1522 of the electrical slip ring 1520 can be connected to the mooring structure 1711. The rotating part 1524 of the electrical slip ring 1520 can be connected to the third column 116. The electrical slip ring 1520 can be configured to maintain electrical continuity between the fixed part 1522 and the rotating part 1524 during rotation therebetween. A first end of the cable 912 (see FIG. 15) can be connected to the wind turbine generator 120 (see FIG. 9) and a second end of the cable 912 (see FIG. 15) can be connected to the rotating part 1524 of the electrical slip ring 1520. A first end of the subsea cable 915 can be connected to the fixed part 1522 of the electrical slip ring 1520 and a second end of the subsea cable 915 can be connected to the junction box 920 (FIG. 9), an onshore facility, or other facility configured to receive the electricity generated by the wind turbine systems 100, 200, 300, 500, 700, 900, 1000, 1200, 1400 described herein. The mooring structure 1711 can include a cable guide tube 1713 through which the subsea cable 915 can pass through to connect to the fixed part 1522 of the electrical slip ring 1520.

Figure 18:
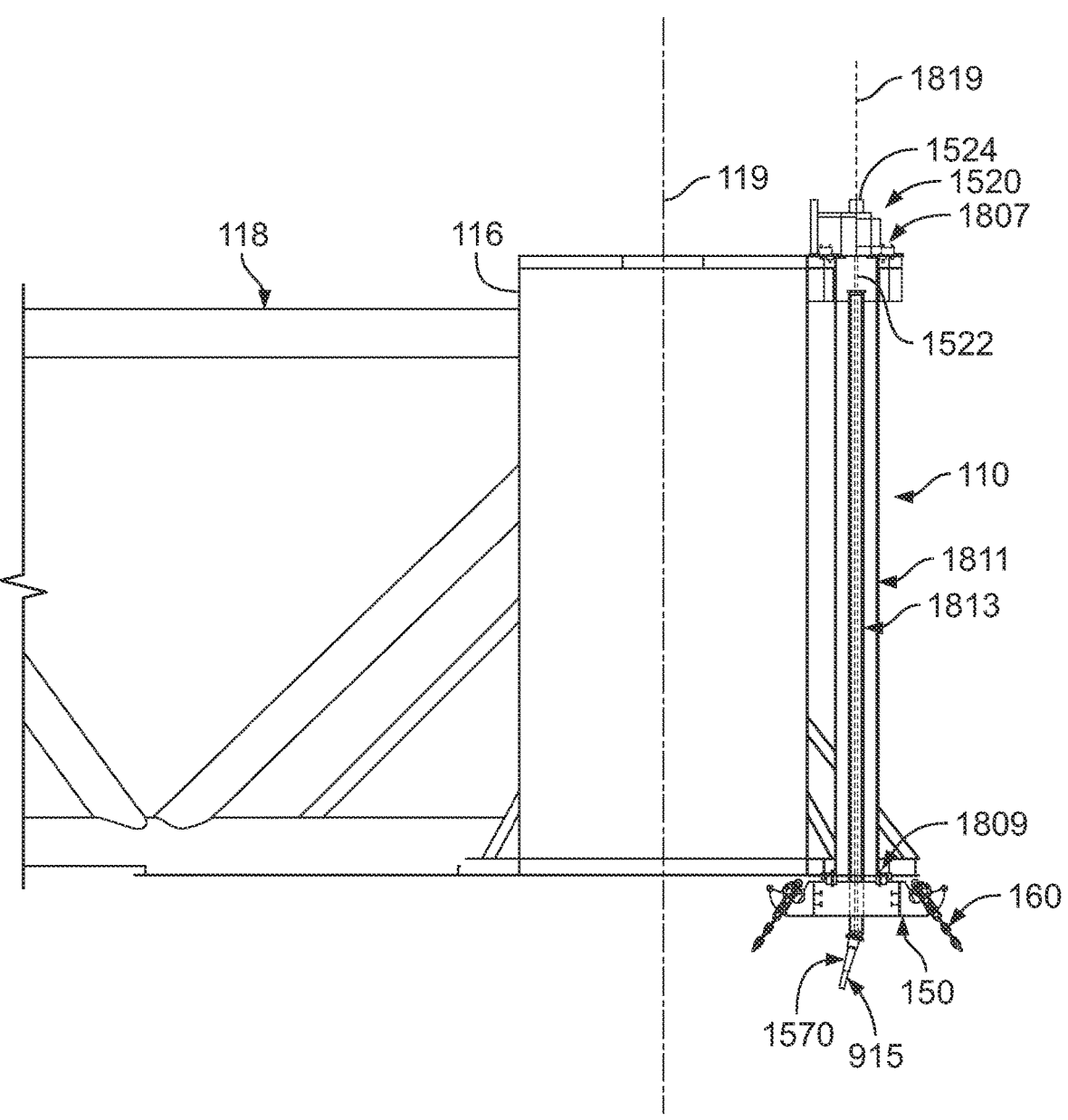
FIG. 18 depicts an elevation view in cross-section of another illustrative column of a support structure that is connected to an illustrative anchor structure such that the support structure is rotatable relative to the anchor structure, according to one or more embodiments described.

FIG. 18 depicts an elevation view in cross-section of another illustrative third column 116 of a support structure 110 that is connected to an illustrative anchor structure 150 such that the support structure 110 is rotatable relative to the anchor structure 150, according to one or more embodiments. The anchor structure 150 depicted in FIG. 18 is configured to be permanently connected to the column 116, according to one or more embodiments. In other embodiments, however, the anchor structure 150 can be configured to be releasably connected to the column 116. In some embodiments, the anchor structure 150 can be fixedly connected to a mooring structure 1811 that can extend from a bottom or first end of the third column 116 to a top or second end of the column 116. In other embodiments, the mooring structure 1811 can extend from a bottom or first end of the third column 116 to a location between the top or second end of the column 116. In other embodiments, the mooring structure 1811 can extend from a location above the bottom or first end of the third column 116 to a location between the top or second end of the column 116. In still other embodiments, the mooring structure 1811 can extend from a location above the bottom or first end of the third column 116 to the top or second end of the column 116. The mooring structure 1811 can be rotatively connected to the third column 116 via one or more bearings, e.g., an upper bearing 1807 and a lower bearing 1809. In some embodiments, the bearings 1807, 1809 can be any suitable mechanical bearing, e.g., a 3-row roller bearing, a wheel and rail type bearing, a plane bearing system, or a bushing type bearing system.

As shown in FIG. 18, a central longitudinal axis 1819 of the anchor structure 150 and the mooring structure 1811 can be offset and parallel with the central longitudinal axis 119 of the third column 116. The arrangement of the mooring structure 1811 and the anchor structure 150 shown in FIG. 18 can also be referred to as a bow mounted configuration of the mooring structure 1811 and the anchor structure 150.

The third column 116 can also include an electrical slip ring 1520 that includes a fixed part 1522 and a rotating part 1524 rotatively connected together. The fixed part 1522 of the electrical slip ring 1520 can be connected to the mooring structure 1811. The rotating part 1524 of the electrical slip ring 1520 can be connected to the third column 116. The electrical slip ring 1520 can be configured to maintain electrical continuity between the fixed part 1522 and the rotating part 1524 during rotation therebetween. A first end of cable 912 (see FIG. 15) can be connected to the wind turbine generator 120 (see FIG. 9) and a second end of the cable 912 (see FIG. 15) can be connected to the rotating part 1524 of the electrical slip ring 1520. A first end of the subsea cable 915 can be connected to the fixed part 1522 of the electrical slip ring 1520 and a second end of the subsea cable 915 can be connected to the junction box 920 (FIG. 9), an onshore facility, or other facility configured to receive the electricity generated by the wind turbine systems 100, 200, 300, 500, 700, 900, 1000, 1200, 1400 described herein. The mooring structure 1811 can include a cable guide tube 1813 through which the subsea cable 915 can pass through to connect to the fixed part 1522 of the electrical slip ring 1520.

Figure 19:
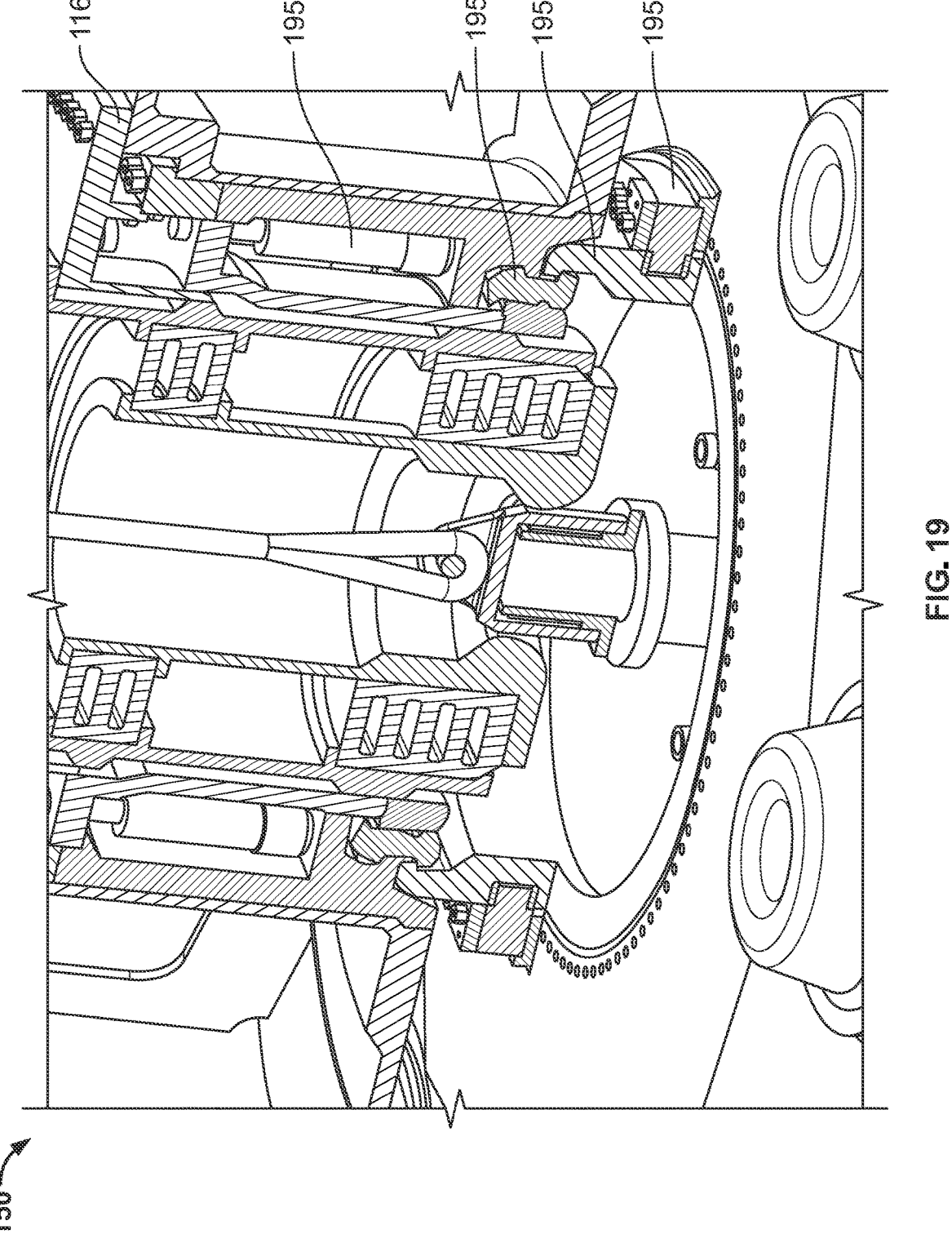
FIG. 19 depicts an isometric cross-section elevation view of an illustrative anchor structure that includes a fixed part and a rotating part, where the rotating part is fixedly connected to a column of a support structure such that the support structure is rotatable relative to the anchor structure, according to one or more embodiments described.

FIG. 19 depicts an isometric cross-section elevation view of an illustrative anchor structure 150 that includes a fixed part 1951 and a rotating part 1952, where the rotating part 1952 is configured to be fixedly connected to the third column 116 of the support structure 110 (see, e.g., FIG. 3) such that the support structure 110 is rotatable relative to the fixed part 1951 of the anchor structure 150, according to one or more embodiments. The rotating part 1952 of the anchor structure 150 can be fixedly connected to the third column 116 via activation of one or more cylinders 1955 that can move a connection ring 1957 into an engaged position with the rotating part 1952 of the anchor structure 150. In some embodiments, the rotating part 1952 of the anchor structure 150 can be fixedly connected to the third column 116 in such a manner that the central longitudinal axis 119 of the column 116 and the anchor structure 150 can be aligned with one another, similar to the configurations shown in FIGS. 11, 15, 16, and 17. It other embodiments, the rotating part 1952 of the anchor structure 150 can be fixedly connected to the third column 116 in such a manner that the central longitudinal axis 119 of the third column and a central longitudinal axis of the anchor structure 150 can be offset and parallel with respect to one another, similar to the configuration shown in FIG. 18. In some embodiments, the anchor structure 150 and the connection system used to connect the anchor structure 150 to the third column 116 can include the system described in U.S. Pat. No. 7,717,762.

Figure 20:
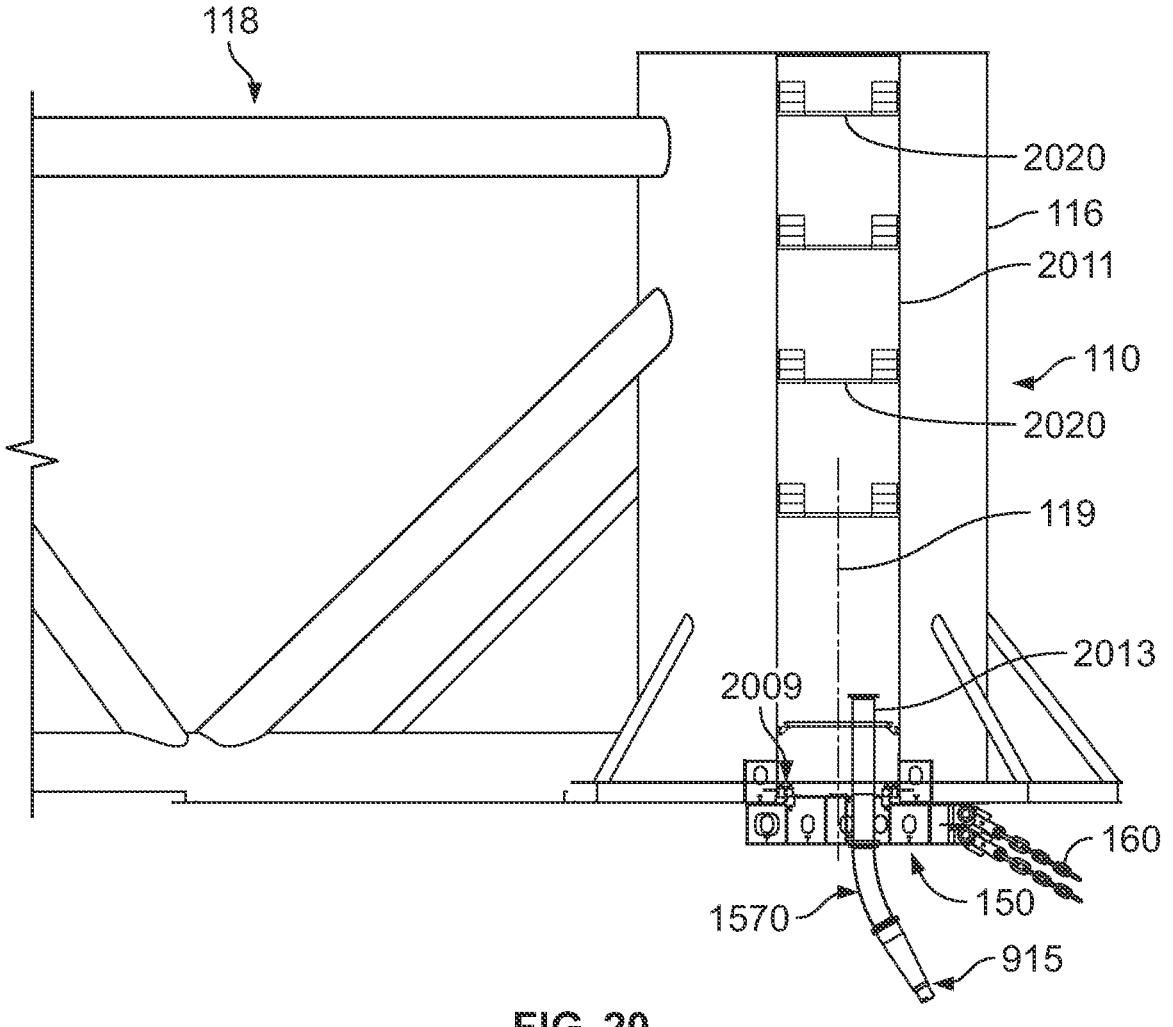
FIG. 20 depicts an elevation view in cross-section of another illustrative column of a support structure that is connected to an illustrative anchor structure such that the support structure is rotatable relative to the anchor structure, according to one or more embodiments described.

FIG. 20 depicts an elevation view in cross-section of another illustrative third column 116 of a support structure 110 that is connected to an illustrative anchor structure 150 such that the support structure 110 is rotatable relative to the anchor structure 150, according to one or more embodiments. In some embodiments, the anchor structure 150 can be rotatively connected to a mooring structure 2011 disposed at least partially within the third column 116 that can extend from a bottom or first end of the third column 116 to a top or second end of the third column 116. The anchor structure 150 can be rotatively connected to the mooring structure 2011 via one or more bearings, e.g., a lower bearing 2009. In some embodiments, not shown, the mooring structure 2011 can be eliminated and the anchor structure 150 can be permanently and rotatively connected directly to the third column 116. In some embodiments, the bearing 2009 can be any suitable mechanical bearing, e.g., a 3-row roller bearing, a wheel and rail type bearing, a plane bearing system, or a bushing type bearing system. The mooring structure 2011 and the support structure 110 can rotate relative to the anchor structure 150, which can be moored to a seabed via mooring lines 160.

In some embodiments, the mooring structure 2011 can include one or more platforms (four are shown) 2020. In some embodiments, the mooring structure 2011 can include an electrical swivel, similar to the electrical swivels 1520 described above. In some embodiments, one of the platforms 2020 can be utilized or serve as an electrical swivel access platform that can be configured to rotate with the rotating part 1524 of the electrical slip ring 1520.

The anchor structure 150 can include one or more cable guide tubes 2013 configured to facilitate passage of the subsea cable 915 through the anchor structure 150 to connect to the fixed part of the electrical slip ring, as described above. The anchor structure 150 can also include a cable bend stiffener 1570 that can be configured to prevent over stressing or over bending of the electrical cable 915 to reduce fatigue and/or wear on the subsea cable 915 extending from the anchor structure 150.

The wind turbine systems 100, 200, 300, 500, 700, 900, 1000, 1200, and/or 1400 which for simplicity and ease of description will be collectively further referred to herein as "the wind turbine systems", can be configured to rotate about the anchor structure 150 during operation thereof to align the plurality of blades 122 with a wind direction during operation of the wind turbine systems. In some embodiments, the wind turbine systems can be configured to passively rotate about the anchor structure 150 to align the plurality of blades 122 with a wind direction during operation of the wind turbine systems. In other words, the wind turbine systems can be free of any active system configured to move or rotate the wind turbine system with respect to the anchor structure 150 during operation thereof. It should be understood, however, when the anchor structure 150 is configured to be disconnectable from the third column 116, a drive mechanism can be used to rotate the mooring support structure rotatively connected to the third column 116 during connection of the support structure 150 to the third column 116, which can facilitate alignment of the support structure 150 with the mooring support structure for connection to one another. In some embodiments, a suitable drive mechanism that can be used to rotate the mooring support structure can be as discussed in U.S. Patent Application Publication No. 2009/0104827.

In some embodiments, the wind turbine generator 120 in the wind turbine systems can be fixed in a stationary position relative to the first and second support arms 130, 140. In some embodiments, the nacelle 321 can be fixed in a stationary position relative to the first and second support arms 130, 140. In some embodiments, the first and second support arms 130, 140 can each be positioned between the plurality of blades 122 and the central longitudinal axis 119 extending from the third column 119. As such, in some embodiments, the plurality of blades 122 can be disposed above a surface of the body of water W. In other embodiments, the plurality of blades 122 can be positioned between the central longitudinal axis 119 extending from the third column 116 and the first and second support arms 130, 140. As such, in some embodiments, the plurality of blades 122 can be located above the truss assembly 118 of the support structure 110.

In some embodiments, the first and second support arms 130, 140 can each have a cross-sectional shape configured to reduce a wind induced drag load on the wind turbine systems and/or to facilitate rotative alignment of the support structure 110 with a wind direction during operation of the wind turbine systems. In some embodiments, the first and second support arms 130, 140 in the wind turbine systems can each include one or more rudders 715 as described above with reference to FIGS. 7 and 8. With regard to the wind turbine system 200 shown in FIG. 2, if the wind turbine system 200 includes one or more rudders 715, the one or more rudders can be incorporated into the second segment or section 234 of the first support arm 130 and/or the second segment or section 240 of the second support arm 140, the first segment 231 of the first column support arm 130 and/or the first segment or section 237 of the second support arm 140.

In some embodiments, one or more additional support arms (not shown) can be disposed between the first and second support arms 130, 140 that can be connected to the truss assembly 118 and/or to an additional column (not shown) and can each include one or more rudders 715. As such, the optional rudders 715 can be incorporated into the first and/or second support arms 130, 140 and/or into one or more additional support arms (not shown) that can be connected to the truss assembly 118 and/or to one or more additional columns (not shown). In at least one embodiment, the support structure 110 can include a fourth column that can be located on the opposite side of the first and second columns 110, 112, with respect to the third column 116. In such embodiment, a support arm or tower can be connected to and extend from the fourth column that can include one or more rudders 715 configured to facilitate proper alignment of the support structure 110 with a wind direction during operation of the wind turbine systems.

In some embodiments, the wind turbine systems can include a ballast medium disposed within the support structure 110 such that a volume of the ballast medium disposed within the support structure 110 can be configured to remain constant during operation of the wind turbine systems. In some embodiments, a center of gravity of the ballast medium and/or an amount of the ballast medium within the support structure 110 can remain constant during operation of the wind turbine systems. In some embodiments, the volume of the ballast medium disposed within the support structure 110 and the center of gravity of the ballast medium within the support structure 110 can remain constant during operation of the wind turbine systems. In some embodiments, the wind turbine systems can be free of an active ballast control system configured to adjust a trim or heel of the support structure 110 during operation of the wind turbine systems. As such, in some embodiments, the wind turbine systems can be free of a ballast system configured to move a ballast medium from one of the first, second, or third columns 112, 114, 116 of the support structure 110 to another one of the first, second, or third columns 112, 114, 116 of the support structure during operation of the wind turbine systems. In some embodiments, the wind turbine systems can also include a control system configured to adjust a pitch of the one or more blades 122 during operation thereof. It should be understood that the wind turbine generator 120 in any of the wind turbine systems can be a horizontal axis wind turbine generator or a vertical axis wind turbine generator.

In some embodiments, the wind turbine systems can include any number of mooring legs 160. In some embodiments, the wind turbine systems can include 2, 3, 4, 5, 6, 7, 8, 9, 10, 11, 12, or more mooring legs 160. In some embodiments, the electrical slip ring 1540 can be configured to transmit electric power of at least 3 MW, at least 5 MW, at least 7 MW, at least 10 MW, at least 12 MW, at least 15 MW, at least 17 MW, at least 20 MW, or at least 25 MW therethrough. In some embodiments, the electrical slip ring 1540 can be configured to transmit electric power in an amount of 3 MW, 5 MW, 10 MW, or 15 MW to 20 MW, 25 MW, 30 MW, or 35 MW.

In some embodiments, the wind turbine systems provided with the electrical slip ring 1520 to transfer the electricity generated by the wind turbine systems can passively weathervane, which can provide for a simplified wind turbine with no tower and/or no yaw bearing drive or control system configured to control a yaw heading of the nacelle 321. This can provide for the use of a simplified wind turbine system that includes the nacelle 321, the blades 122 with pitch control and the wind turbine generator 120. This can also eliminate the need for a ballast system to control the heel or trim of the support structure 110 as a function of wind direction.

The anchor structure 150 can be integrated permanently with the third column 116 or can be designed as a disconnectable anchor structure that includes the buoyancy module 1551 that can support the mooring legs 160 and the subsea cable(s) 915 when detached from the third column 116. The buoyancy module 1551 can be configured to be submerged at a pre-determined depth or to be floating at the waterline. The buoyancy module 1551 can also be configured to be an integral part of the support structure 110, e.g., a portion of the third column 116 that when connected thereto can complete the geometry and buoyancy required for the support structure 110. The use of an anchor structure 150 with the buoyancy module 1551 can allow pre-installation of the anchor structure 150, mooring legs 160, and subsea cable(s) 915 before the support structure 110 is brought to the location, which can provide a more efficient connection and a shorter schedule for integration. As such the wind turbine systems can provide a reduced installation time that can be significant when considering that a floating wind farm can have 10+ wind turbine systems that need to be installed. As such, the installation of the wind turbine systems can facilitate a shorter installation schedule to first power and a more efficient and cost-effective installation and hook-up campaigns.

In some embodiments, when the wind turbine system includes an anchor structure 150 that can be releasably connected to the third column, the time required to install the wind turbine system can be significantly reduced. In some embodiments, a wind farm that includes at least two wind turbine systems can be installed. In such embodiment, the anchor structures 150 can be pre-installed by connecting the mooring legs 160 to the anchor structures 150 and to the floor of the body of water. The subsea cables 915 can also be preinstalled and connected to the desired facility that can be configured to receive electric power from the wind turbine system once installed and operating. A corresponding number of support structures that include the first support arm and the second support arm connected thereto and, optionally, the wind turbine generator and further optionally the plurality of blades 122 can be transported to a corresponding anchor structure 150 and connected thereto.

In some embodiments a wind farm can include a large number of floating wind turbine systems. In such embodiments, there can be, for example, 20, 50, 75, 100, or more floating wind turbine systems installed. In such wind farms, it can be desirable to have, for example up to 100 anchor structures 150, with corresponding mooring legs 160 and subsea cables 915 connected to or supported by the anchor structures 150. In such wind farms, it can be desirable to have, for example one hundred and two (102) support structures 110 for 100 anchor structures 150 thus providing an N+n, where "N" is the number of wind turbine systems online at any one time and "n" is the number of spare wind turbine systems. In some embodiments, N can equal 100 and "n" can equal 1, 2, 3, 4, 5, 6, 7, or more. Such floating wind farm can be configured such that it is possible to disconnect one or more mooring structures, e.g., 1505, 1603, 1711, 1811, and/or 2011, from one or more corresponding anchor structures 150 and/or the anchor structure shown in FIG. 19 from the support structure 110 and take the disconnected support structures 110 to shore for maintenance or repair and to connect a "spare" support structure 110 complete with a wind turbine such that there is essentially always "N" turbine systems "on line" while simultaneously having "n" for example 2 off line and disconnected from a power cable and anchor structure 150 for maintenance and/or repairs.

In some embodiments, a process for installing a floating wind turbine support structure can include laying a plurality of mooring legs 160 on the floor of a body of water W. The second ends 162 of each leg of the mooring legs 160 can be connected to the floor or seabed S of the body of water W. An anchor structure 150 that can include a buoyancy module 1551 can be positioned on the surface of the body of water W. The first ends 161 of each leg of the mooring legs 160 can be connected to the anchor structure 150, e.g., to the buoyancy module 1551. A first end 1545 of one or more subsea cables 915 can be inserted into and supported by the anchor structure 150. The second end of the subsea cable 915 can be connected to the junction box 920 or other facility configured to receive electric power generated by the wind turbine system. The anchor structure 150 can float at a neutral position below the surface of the body of water W when the plurality of mooring legs 160 and the one or more subsea cables 915 are connected thereto. The support structure 110 can be positioned above the anchor structure 150. The anchor structure 150, at least portion of each mooring leg 160, and at least a portion of the subsea cable 915 can be lifted such that the anchor structure 150 can be connected to the mooring structure, e.g., 1505, 1603, 1711, and/or 1811, of the support structure 110. The first end of the cable 915 can be connected to the fixed part 1522 of the electrical swivel 1520.

In some embodiments, a process for installing a floating wind turbine support structure can include laying a plurality of mooring legs 160 on the floor or seabed S of a body of water W, connecting the second ends 162 of each leg of the plurality of mooring legs 160 to the floor or seabed S of the body of water W, positioning an anchor structure 150 on the surface of the body of water W, connecting the first ends 161 of each leg of the mooring legs 160 to the anchor structure 150, e.g., to the buoyancy module 1551, lowering each anchor structure 150 to a neutral position below the surface of the body of water W, positioning the support structure 110 above the anchor structure 150, lifting the anchor structure 150 and connecting the anchor structure 150 to the corresponding mooring structure, e.g., 1505, 1603, 1711, and/or 1811, of the support structure 110, connecting the subsea cable 915 to the anchor structure 150, and connecting the first end of the subsea cable 915 to the fixed part 1522 of the swivel 1520.

In some embodiments of the process for installing a floating wind turbine support structure, the step of positioning an anchor structure 150 on the surface of the body of water W, connecting the first ends 161 of each leg of the mooring legs 160 to the anchor structure 150, e.g., to the buoyancy module 1551, lowering each anchor structure 150 to a neutral position below the surface of the body of water W can be performed or repeated for a plurality of anchor structures 150, and then the steps of positioning the support structure 110 above the anchor structure 150, lifting the anchor structure 150 and connecting the anchor structure 150 to the corresponding mooring structure, e.g., 1505, 1603, 1711, and/or 1811, of the support structure 110, connecting the subsea cable 915 to the anchor structure 150, and connecting the first end of the subsea cable 915 to the fixed part 1522 of the swivel 1520 can be performed or repeated for a corresponding plurality of support structures 110.

In some embodiments, a process for installing a floating wind turbine support structure can include laying a plurality of mooring legs 160 on the floor or seabed S of a body of water W, connecting the second ends 162 of each leg of the plurality of mooring legs 160 to the floor or seabed S of the body of water W, positioning an anchor structure 150 on the surface of the body of water W, connecting the first ends 161 of each leg of the mooring legs 160 to the anchor structure 150, e.g., to the buoyancy module 1551, maintaining each anchor structure 150 on the surface of the body of water W when the one or more mooring legs 160 are connected thereto, positioning the support structure 110 adjacent the anchor structure 150, connecting the anchor structure 150 to the corresponding mooring structure, e.g., 1505, 1603, 1711, and/or 1811, of the support structure 110, connecting the subsea cable 915 to the anchor structure 150, and connecting the first end of the subsea cable 915 to the fixed part 1522 of the swivel 1520.

In some embodiments of the process for installing a floating wind turbine support structure, the step of positioning an anchor structure 150 on the surface of the body of water W, connecting the first ends 161 of each leg of the mooring legs 160 to the anchor structure 150, e.g., to the buoyancy module 1551, and maintaining the anchor structure 150 on the surface of the body of water W when the one or more mooring legs are connected thereto can be performed or repeated for a plurality of anchor structures 150, and then the steps of positioning the support structure 110 adjacent the anchor structure 150 and connecting the anchor structure 150 to the corresponding mooring structure, e.g., 1505, 1603, 1711, and/or 1811, of the support structure 110, connecting the subsea cable 915 to the anchor structure 150, and connecting the first end of the subsea cable 915 to the fixed part 1522 of the swivel 1520 can be performed or repeated for a corresponding plurality of support structures 110.

The present disclosure further relates to any one or more of the following numbered embodiments:

1. An offshore wind turbine system, comprising: a wind turbine generator comprising a plurality of blades connected thereto; a first support arm and a second support arm each comprising a first end and a second end; and a support structure configured to float on a surface of a body of water comprising a first column, a second column, and a third column, wherein: the first end of the first support arm and the first end of the second support arm each support the wind turbine generator at an elevation above the support structure, the second end of the first support arm is connected to and supported by the first column, and the second end of the second support arm is connected to and supported by the second column.

2. The system of paragraph 1, further comprising a tower having a first end and a second end, wherein the first end of the tower supports the wind turbine generator and the second end of the tower is supported by the first end of the first support arm and the first end of the second support arm.

3. The system of paragraph 2, further comprising a platform, wherein the first end of the first support arm and the first end of the second support arm support the platform, and wherein the second end of the tower is supported by the platform.

4. The system of any one of paragraphs 1 to 3, wherein the wind turbine generator is fixed in a stationary position relative to the first and second support arms.

5. The system of any one of paragraphs 1 to 4, wherein the first support arm and the second support arm are each positioned between the plurality of blades and a central longitudinal axis extending from the third column.

6. The system of any one of paragraphs 1 to 5, wherein the plurality of blades is positioned between a central longitudinal axis extending from the third column and the first and second support arms.

7. The system of any one of paragraphs 1 to 6, wherein the first support arm and the second support arm each have a cross-sectional shape configured to reduce a wind induced drag load on the system and to facilitate rotative alignment of the support structure with a wind direction during operation of the wind turbine system.

8. The system of any one of paragraphs 1 to 7, further comprising a ballast medium disposed within the support structure, wherein a volume of the ballast medium disposed within the support structure remains constant during operation of the wind turbine system.

9. The system of paragraph 8, wherein a center of gravity of the ballast medium within the support structure remains constant during operation of the wind turbine system.

10. The system of any one of paragraphs 1 to 9, wherein the wind turbine system is free of an active ballast control system configured to adjust a trim or a heel of the support structure during operation of the wind turbine system.

11. The system of any one of paragraphs 1 to 9, wherein the wind turbine system is free of a ballast system configured to move a ballast medium from one of the first, second, or third columns of the support structure to another one of the first, second, or third columns of the support structure during operation of the wind turbine system.

12. The system of any one of paragraphs 1 to 11, wherein the wind turbine generator is disposed within a nacelle.

13. The system of paragraph 12, wherein the system is free of any control system configured to control a yaw heading of the nacelle.

14. The system of paragraph 12 or paragraph 13, wherein the system further comprises mechanical handling equipment disposed on or connected to the support structure, the first support arm, the second support arm, the nacelle, or a combination thereof, the mechanical handling equipment configured to facilitate installation, removal, or both installation and removal of the plurality of blades, the wind turbine generator, a gear box, a controller, a transformer, a rotor shaft, a brake assembly, or other component inside the nacelle when the support structure is floating on the surface of the body of water.

15. The system of paragraph 14, wherein the mechanical handling equipment comprises a crane, a winch, an arrangement of sheaves movable on the top of the nacelle, or a combination thereof.

16. The system of any one of paragraphs 1 to 15, further comprising a control system configured to adjust a pitch of the plurality of blades during operation.

7. The system of any one of paragraphs 1 to 16, wherein at least one of the first support arm and the second support arm further comprises an adjustable rudder disposed between the first end and the second end thereof.

8. The system of any one of paragraphs 1 to 17, wherein the first, second, and third columns are connected to one another by a truss assembly.

9. The system of any one of paragraphs 1 to 18, further comprising an anchor structure configured to be connected to the third column of the support structure and to a floor of the body of water, wherein, when the anchor structure is connected to the third column, the support structure is configured to passively rotate relative to the anchor structure to align the plurality of blades with a wind direction during operation of the wind turbine system.

20. The system of paragraph 19, wherein a central longitudinal axis of the anchor structure is offset and parallel with a central longitudinal axis of the third column when connected thereto.

21. The system of paragraph 19, wherein a central longitudinal axis of the anchor structure is aligned with a central longitudinal axis of the third column when connected thereto.

22. The system of any one of paragraphs 19 to 21, further comprising a mooring structure rotatively connected to the third column of the support structure, wherein the mooring structure is configured to fixedly connect to the anchor structure, and wherein the mooring structure is configured to permit rotation of the support structure relative to the anchor structure.

23. The system of any one of paragraphs 19 to 21, wherein the anchor structure comprises a fixed part and a rotating part rotatively connected together, wherein the rotating part of the anchor structure is configured to be connected to the third column of the support structure to permit rotation of the support structure relative to the fixed part of the anchor structure.

24. The system of any one of paragraphs 19 to 23, wherein the anchor structure comprises a buoyancy module.

25. The system of paragraph 24, wherein the buoyancy module forms part of the third column when the anchor structure and the mooring structure are connected to one another.

26. The system of any one of paragraphs 19 to 25, further comprising a plurality of mooring legs each having a first end and a second end, wherein the first end of each mooring leg is configured to be connected to the anchor structure and the second end of each mooring leg is configured to be connected to a floor of the body of water.

27. The system of any one of paragraphs 19 to 26, further comprising, an electrical slip ring comprising a fixed part and a rotating part rotatively connected together, wherein the fixed part of the electrical slip ring is connected to the anchor structure, wherein the rotating part of the electrical slip ring is connected to the support structure, and wherein the electrical slip ring is configured to maintain electrical continuity between the fixed part and the rotating part during rotation therebetween.

28. The system of paragraph 27, further comprising a first cable comprising a first end configured to be electrically connected to the wind turbine generator and a second end configured to be electrically connected to the rotating part of the electrical slip ring.

29. The system of paragraph 28, wherein the offshore wind turbine system is configured to receive and support a second cable comprising a first end configured to be releasably connected to the fixed part of the electrical slip ring and a second end configured to be connected to a facility configured to receive electrical power generated by the wind turbine such that the wind turbine is configured to be electrically connected to the facility when the first end of the second cable is connected to the fixed part of the electrical slip ring and the second end of the second cable is connected to the facility.

30. The system of paragraph 29, further comprising a connection assembly configured to connect and disconnect the first end of the second cable to and from the fixed part of the electrical slip ring.

31. The system of any one of paragraphs 27 to 30, wherein the electrical slip ring is configured to transmit an electric power of at least 3 MW, at least 5 MW, at least 7 MW, at least 10 MW, at least 12 MW, at least 15 MW, at least 17 MW, at least 20 MW, or at least 25 MW therethrough.

32. The system of any one of paragraphs 1 to 31, wherein the wind turbine generator is a horizontal axis wind turbine generator.

33. The system of any one of paragraphs 1 to 31, wherein the wind turbine generator is a vertical axis wind turbine generator.

34. A process for installing a floating wind turbine support structure, comprising: laying a plurality of mooring legs on a floor of a body of water; positioning an anchor structure that includes a buoyancy module on the surface of the body of water; connecting a first end of one or more mooring legs to the anchor structure; connecting a second end of the one or more mooring legs to the floor of the body of water; lowering the anchor structure to a stable position below the surface of the body of water when the one or more mooring legs are connected thereto; positioning the floating wind turbine support structure above the anchor structure; lifting the anchor structure and at least portion of the one or more mooring legs such that the anchor structure can be connected to a mooring structure of the floating wind turbine support structure; and connecting the anchor structure to the mooring structure of the floating wind turbine support structure.

35. A process for installing a floating wind turbine support structure, comprising: laying a plurality of mooring legs on a floor of a body of water; positioning an anchor structure that includes a buoyancy module on the surface of the body of water; connecting a first end of one or more mooring legs to the anchor structure; connecting a second end of the one or more mooring legs to the floor of the body of water; maintaining the anchor structure on the surface of the body of water when the one or more mooring legs are connected thereto; positioning the floating wind turbine support structure adjacent the anchor structure; and connecting the anchor structure to the floating wind turbine support structure.

36. The process of paragraph 34 or paragraph 35, wherein a wind turbine generator comprising a plurality of blades connected thereto is disposed on and supported by the floating wind turbine support structure when the anchor structure is connected to the floating wind turbine support structure.

37. The process of paragraph 34 or paragraph 35, further comprising, installing a wind turbine generator comprising a plurality of blades connected thereto such that the wind turbine generator and the plurality of blades is disposed on and supported by the floating wind turbine support structure.

38. The process of paragraph 34 or paragraph 35, further comprising, installing a wind turbine generator on the floating wind turbine support structure such that the wind turbine generator is disposed on and supported by the floating wind turbine support structure.

39. The process of paragraph 38, further comprising, after installing the wind turbine generator on the floating wind turbine support structure, connecting a plurality of blades to the wind turbine generator.

40. The process of any one of paragraphs 34 to 39, further comprising connecting a first end of a subsea cable to the anchor structure such that the first end of the subsea cable is supported by the anchor structure.

41. The process of paragraph 40, further comprising connecting a second end of the subsea cable to a facility configured to receive electric power generated by the wind turbine generator.

42. The process of any one of paragraphs 36 to 41, wherein the floating wind turbine support structure comprises a first support arm and a second support arm each comprising a first end and a second end; and a support structure configured to float on the surface of the body of water comprising a first column, a second column, and a third column, wherein: the first end of the first support arm and the first end of the second support arm each support the wind turbine generator at an elevation above the support structure, the second end of the first support arm is connected to and supported by the first column, the second end of the second support arm is connected to and supported by the second column, and the anchor structure is connected to the third column.

43. The process of any one of paragraphs 36 to 42, wherein the floating wind turbine support structure is configured to passively rotate relative to the anchor structure to align the plurality of blades with a wind direction during operation of the wind turbine generator.

44. The process of paragraph 42 or paragraph 43, wherein a central longitudinal axis of the anchor structure is offset and parallel with a central longitudinal axis of the third column when connected thereto.

45. The process of any one of paragraphs 42 to 44, wherein the floating wind turbine support structure further comprises a mooring structure rotatively connected to the third column of the floating wind turbine support structure, wherein the mooring structure is configured to fixedly connect to the anchor structure, and wherein the mooring structure is configured to permit rotation of the floating wind turbine support structure relative to the anchor structure.

46. The process of any one of paragraphs 42 to 44, wherein the anchor structure comprises a fixed part and a rotating part rotatively connected together, wherein the rotating part of the anchor structure is connected to the third column of the floating wind turbine support structure to permit rotation of the floating wind turbine support structure relative to the fixed part of the anchor structure.

47. The process of any one of paragraphs 42 to 46, wherein the buoyancy module forms part of the third column when the anchor structure and the mooring structure are connected to one another.

48. The process of any one of paragraphs 42 to 47, wherein the floating wind turbine support structure further comprises a tower having a first end and a second end, wherein the first end of the tower supports the wind turbine generator and the second end of the tower is supported by the first end of the first support arm and the first end of the second support arm.

49. The process of any one of paragraphs 42 to 48, wherein the wind turbine generator is fixed in a stationary position relative to the first and second support arms.

50. The process of any one of paragraphs 42 to 49, wherein the first support arm and the second support arm are each positioned between the plurality of blades and a central longitudinal axis extending from the third column.

51. The process of any one of paragraphs 42 to 50, wherein the plurality of blades is positioned between a central longitudinal axis extending from the third column and the first and second support arms.

52. The process of any one of paragraphs 42 to 51, wherein the first support arm and the second support arm each have a cross-sectional shape configured to reduce a wind induced drag load on the floating wind turbine support structure and to facilitate rotative alignment of the floating wind turbine support structure with a wind direction during operation of the wind turbine generator.

53. The process of any one of paragraphs 34 to 52, wherein the floating wind turbine support structure comprises a ballast medium disposed within the floating wind turbine support structure, wherein a volume of the ballast medium disposed within the floating wind turbine support structure remains constant during operation of the wind turbine generator.

54. The process of paragraph 53, wherein a center of gravity of the ballast medium within the floating wind turbine support structure remains constant during operation of the wind turbine generator.

55. The process of any one of paragraphs 34 to 54, wherein the floating wind turbine support structure is free of an active ballast control system configured to adjust a trim or a heel of the floating wind turbine support structure during operation of the wind turbine generator.

56. The process of any one of paragraphs 42 to 54, wherein the floating wind turbine support structure is free of a ballast system configured to move a ballast medium from one of the first, second, or third columns of the floating wind turbine support structure to another one of the first, second, or third columns of the support structure during operation of the wind turbine generator.

57. The process of any one of paragraphs 36 to 56, wherein the wind turbine generator is disposed within a nacelle, and wherein the floating wind turbine support structure further comprises mechanical handling equipment disposed on or connected to the first support arm, the second support arm, the nacelle, or a combination thereof, the mechanical handling equipment configured to facilitate installation, removal, or both installation and removal of the plurality of blades, the wind turbine generator, a gear box, a controller, a transformer, a rotor shaft, a brake assembly, or other component inside the nacelle when the floating wind turbine support structure is floating on the surface of the body of water.

58. The process of any one of paragraphs 36, 37, or 39 to 57, further comprising a control system configured to adjust a pitch of the plurality of blades during operation.

59. The process of any one of paragraphs 42 to 58, wherein at least one of the first support arm and the second support arm further comprise an adjustable rudder disposed between the first end and the second end thereof.

60. The process of any one of paragraphs 34 to 59, wherein the floating wind turbine support structure further comprises an electrical slip ring comprising a fixed part and a rotating part rotatively connected together, wherein the fixed part of the electrical slip ring is connected to the anchor structure, wherein the rotating part of the electrical slip ring is connected to the floating wind turbine support structure, and wherein the electrical slip ring is configured to maintain electrical continuity between the fixed part and the rotating part during rotation therebetween.

61. The process of paragraph 60, further comprising connecting a first end of a first cable to the wind turbine generator and a second end to the rotating part of the electrical slip ring.

62. The process of paragraph 61, further comprising connecting a first end of a second cable to the fixed part of the electrical slip ring and a second end to a facility configured to receive electrical power generated by the wind turbine such that the wind turbine is electrically connected to the facility.

63. The process of any one of paragraphs 36 to 62, wherein the wind turbine generator is a horizontal axis wind turbine generator.

64. The process of any one of paragraphs 36 to 62, wherein the wind turbine generator is a vertical axis wind turbine generator.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art. Accordingly, various embodiments of the disclosure may deviate from the numbers, values, and ranges disclosed herein without departing from the intended scope.

Various terms have been defined above. To the extent a term used in a claim can be not defined above, it should be given the broadest definition persons in the pertinent art have given that term as reflected in at least one printed publication or issued patent. Furthermore, all patents, test procedures, and other documents cited in this application are fully incorporated by reference to the extent such disclosure can be not inconsistent with this application and for all jurisdictions in which such incorporation can be permitted.

While certain preferred embodiments of the present invention have been illustrated and described in detail above, it can be apparent that modifications and adaptations thereof will occur to those having ordinary skill in the art. It should be, therefore, expressly understood that such modifications and adaptations may be devised without departing from the basic scope thereof, and the scope thereof can be determined by the claims that follow.

What is claimed is:

1. An offshore wind turbine system, comprising:
a wind turbine generator comprising a plurality of blades connected thereto;
a tower having a first end and a second end;
a first support arm and a second support arm each comprising a first end and a second end; and
a support structure configured to float on a surface of a body of water comprising a first column, a second column, and a third column, wherein:
the first end of the tower supports the wind turbine generator at an elevation above the support structure,
the second end of the tower is supported by the first end of the first support arm and the first end of the second support arm,
the second end of the first support arm is connected to and supported by the first column,
the second end of the second support arm is connected to and supported by the second column, and
the system is free of a third support arm that supports the wind turbine generator.

2. The system of claim 1, wherein the wind turbine generator is fixed in a stationary position relative to the first and second support arms.

3. The system of claim 1, wherein the first support arm and the second support arm are each positioned between the plurality of blades and a central longitudinal axis extending from the third column.

4. The system of claim 1, wherein the plurality of blades is positioned between a central longitudinal axis extending from the third column and the first and second support arms.

5. The system of claim 1, wherein the first support arm and the second support arm each have a cross-sectional shape configured to reduce a wind induced drag load on the system and to facilitate rotative alignment of the support structure with a wind direction during operation of the wind turbine system.

6. The system of claim 1, further comprising a ballast medium disposed within the support structure, wherein a volume of the ballast medium disposed within the support structure remains constant during operation of the wind turbine system.

7. The system of claim 6, wherein a center of gravity of the ballast medium within the support structure remains constant during operation of the wind turbine system.

8. The system of claim 1, wherein the wind turbine system is free of an active ballast control system configured to adjust a trim or a heel of the support structure during operation of the wind turbine system.

9. The system of claim 1, wherein the wind turbine system is free of a ballast system configured to move a ballast medium from one of the first, second, or third columns of the support structure to another one of the first, second, or third columns of the support structure during operation of the wind turbine system.

10. The system of claim 1, wherein the wind turbine generator is disposed within a nacelle, the system further comprising mechanical handling equipment disposed on or connected to the support structure, the first support arm, the second support arm, the nacelle, or a combination thereof, the mechanical handling equipment configured to facilitate installation, removal, or both installation and removal of the plurality of blades, the wind turbine generator, a gear box, a controller, a transformer, a rotor shaft, a brake assembly, or other component inside the nacelle when the support structure is floating on the surface of the body of water.

11. The system of claim 1, further comprising a control system configured to adjust a pitch of the plurality of blades during operation.

12. The system of claim 1, further comprising an anchor structure configured to be connected to the third column of the support structure and to a floor of the body of water, wherein, when the anchor structure is connected to the third column, the support structure is configured to passively rotate relative to the anchor structure to align the plurality of blades with a wind direction during operation of the wind turbine system.

13. The system of claim 12, wherein a central longitudinal axis of the anchor structure is offset and parallel with a central longitudinal axis of the third column when connected thereto.

14. The system of claim 12, further comprising a mooring structure rotatively connected to the third column of the support structure, wherein the mooring structure is configured to fixedly connect to the anchor structure, and wherein the mooring structure is configured to permit rotation of the support structure relative to the anchor structure.

15. The system of claim 12, wherein the anchor structure comprises a fixed part and a rotating part rotatively connected together, wherein the rotating part of the anchor structure is configured to be connected to the third column of the support structure to permit rotation of the support structure relative to the fixed part of the anchor structure.

16. The system of claim 12, wherein:
the anchor structure comprises a buoyancy module, and
the buoyancy module forms part of the third column when the anchor structure and the mooring structure are connected to one another.

17. The system of claim 12, further comprising a plurality of mooring legs each having a first end and a second end, wherein the first end of each mooring leg is configured to be connected to the anchor structure and the second end of each mooring leg is configured to be connected to the floor of the body of water.

18. The system of claim 1, wherein the support structure is free of a fourth column.

19. An offshore wind turbine system, comprising:
a wind turbine generator comprising a plurality of blades connected thereto;
a first support arm and a second support arm each comprising a first end and a second end; and
a support structure configured to float on a surface of a body of water comprising a first column, a second column, and a third column, wherein:
the first end of the first support arm and the first end of the second support arm each support the wind turbine generator at an elevation above the support structure, the second end of the first support arm is connected to and supported by the first column, the second end of the second support arm is connected to and supported by the second column, the system is free of a third support arm that supports the wind turbine generator, at least one of the first support arm and the second support arm further comprises an adjustable rudder disposed between the first end and the second end thereof, and the adjustable rudder is incorporated into the at least one of the first support arm and that second support arm such that a longitudinal axis of the adjustable rudder is located within the at least one of the first support arm and the second support arm.

20. An offshore wind turbine system, comprising:

a wind turbine generator comprising a plurality of blades connected thereto;

a first support arm and a second support arm each comprising a first end and a second end;

a support structure configured to float on a surface of a body of water comprising a first column, a second column, and a third column, wherein:

the first end of the first support arm and the first end of the second support arm each support the wind turbine generator at an elevation above the support structure, the second end of the first support arm is connected to and supported by the first column, the second end of the second support arm is connected to and supported by the second column, and the system is free of a third support arm that supports the wind turbine generator;

an anchor structure configured to be connected to the third column of the support structure and to a floor of the body of water, wherein, when the anchor structure is connected to the third column, the support structure is configured to passively rotate relative to the anchor structure to align the plurality of blades with a wind direction during operation of the wind turbine system;

an electrical slip ring comprising a fixed part and a rotating part rotatively connected together, wherein the fixed part of the electrical slip ring is connected to the anchor structure, wherein the rotating part of the electrical slip ring is connected to the support structure, and wherein the electrical slip ring is configured to maintain electrical continuity between the fixed part and the rotating part during rotation therebetween; and a first cable comprising a first end configured to be electrically connected to the wind turbine generator and a second end configured to be electrically connected to the rotating part of the electrical slip ring, wherein the offshore wind turbine system is configured to receive and support a second cable comprising a first end configured to be releasably connected to the fixed part of the electrical slip ring and a second end configured to be connected to a facility configured to receive electrical power generated by the wind turbine such that the wind turbine is configured to be electrically connected to the facility when the first end of the second cable is connected to the fixed part of the electrical slip ring and the second end of the second cable is connected to the facility.

21. The system of claim 20, further comprising a tower having a first end and a second end, wherein the first end of the tower supports the wind turbine generator and the second end of the tower is supported by the first end of the first support arm and the first end of the second support arm.

22. The system of claim 20, wherein the plurality of blades is positioned between a central longitudinal axis extending from the third column and the first and second support arms.

23. The system of claim 20, wherein a central longitudinal axis of the anchor structure is offset and parallel with a central longitudinal axis of the third column when connected thereto.

24. An offshore wind turbine system, comprising:

a wind turbine generator comprising a plurality of blades connected thereto;

a first support arm and a second support arm each comprising a first end and a second end; and a support structure configured to float on a surface of a body of water comprising a first column, a second column, and a third column, wherein:

the first and second support arms each comprise a first section and a second section, a first end of the first section of the first and second support arms each support the wind turbine generator at an elevation above the support structure, a second end of the first section of the first and second support arms is connected to a first end of the second section of the first and second support arms, respectively, a second end of the second section of the first and second support arms is connected to and supported by the first and second columns, respectively, the first sections of the first and second support arms form an A-frame type configuration, the second sections of the first and second support arms extend away from the first and second columns, respectively, in a substantially vertical direction such that the second sections of the first and second support arms are oriented within 15 degrees of an axis that is vertical with respect to a central longitudinal axis of the first and second columns, respectively, and the system is free of a third support arm that supports the wind turbine generator.

* * * * *